United States Patent
Maruta et al.

(10) Patent No.: US 11,149,882 B2
(45) Date of Patent: Oct. 19, 2021

(54) THREADED CONNECTION

(71) Applicants:Nippon Steel & Sumitomo Metal Corporation, Tokyo (JP); Vallourec Oil and Gas France, Aulnoye-Aymeries (FR)

(72) Inventors: Satoshi Maruta, Tokyo (JP); Michihiko Iwamoto, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 306 days.

(21) Appl. No.: 16/314,133

(22) PCT Filed: Sep. 15, 2017

(86) PCT No.: PCT/JP2017/033565
§ 371 (c)(1),
(2) Date: Dec. 28, 2018

(87) PCT Pub. No.: WO2018/052141
PCT Pub. Date: Mar. 22, 2018

(65) Prior Publication Data
US 2019/0203857 A1    Jul. 4, 2019

(30) Foreign Application Priority Data

Sep. 16, 2016  (JP) .............................. JP2016-181175

(51) Int. Cl.
*F16L 15/00*  (2006.01)
*F16L 15/04*  (2006.01)
*E21B 17/042* (2006.01)

(52) U.S. Cl.
CPC ............ *F16L 15/04* (2013.01); *E21B 17/042* (2013.01); *F16L 15/002* (2013.01)

(58) Field of Classification Search
CPC ........ F16L 15/002; F16L 15/007; F16L 15/06
(Continued)

(56) References Cited

U.S. PATENT DOCUMENTS 3,854,760 A * 12/1974 Duret .................... E21B 17/042
                                                285/334
3,989,284 A * 11/1976 Blose .................... E21B 17/042
                                                285/332.2
(Continued)

FOREIGN PATENT DOCUMENTS

CN        102257306 A    11/2011
DE         3207180 C1     7/1983
(Continued)

OTHER PUBLICATIONS

English Abstract & Family List of JP2004238942A.
(Continued)

*Primary Examiner* — David Bochna
(74) *Attorney, Agent, or Firm* — Banner & Witcoff, Ltd.

(57) ABSTRACT

A threaded connection includes a pin including a wedge male thread having a varying-thread-width portion and a box including a wedge female thread having a varying-thread-width portion. The threaded connection is constructed such that, when both stab flanks and load flanks of the male thread of the pin contact the box, the shoulder on the pin is not in contact with the shoulder on the pin, and, with a further rotation in the make-up direction, the shoulder on the pin is capable of contacting the shoulder on the pin before the threads (i.e. male and female threads) yield.

12 Claims, 17 Drawing Sheets

(58) Field of Classification Search
USPC .......................................................... 285/334
See application file for complete search history.

(56) References Cited

U.S. PATENT DOCUMENTS

| | | | |
|---|---|---|---|
| 4,611,838 A | | 9/1986 | Heilmann et al. |
| 4,629,222 A | * | 12/1986 | Dearden ................ E21B 17/042 |
| | | | 285/332.4 |
| 4,629,223 A | * | 12/1986 | Dearden ................ E21B 17/042 |
| | | | 285/334 |
| 4,786,090 A | * | 11/1988 | Mott ..................... F16L 15/003 |
| | | | 285/332.3 |
| 4,822,081 A | * | 4/1989 | Blose .................... F16L 15/003 |
| | | | 285/334 |
| 5,782,503 A | | 7/1998 | Noel et al. |
| 6,206,436 B1 | * | 3/2001 | Mallis .................. E21B 17/042 |
| | | | 285/334 |
| 7,717,478 B2 | * | 5/2010 | Reynolds, Jr. ........ F16L 15/004 |
| | | | 285/334 |
| 8,029,025 B1 | * | 10/2011 | Sivley, IV ............ F16L 15/002 |
| | | | 285/333 |
| 8,827,322 B2 | * | 9/2014 | Granger ................ E21B 17/042 |
| | | | 285/334 |
| 8,882,157 B2 | * | 11/2014 | Chelette ................. F16L 15/06 |
| | | | 285/334 |
| 8,925,975 B2 | * | 1/2015 | Granger ................ E21B 17/042 |
| | | | 285/334 |
| 10,968,706 B2 | * | 4/2021 | Martin ................ E21B 17/0423 |
| 2002/0027363 A1 | * | 3/2002 | Mallis ................ E21B 17/0423 |
| | | | 285/334 |
| 2006/0145480 A1 | * | 7/2006 | Mallis ................. E21B 17/0423 |
| | | | 285/390 |
| 2011/0278838 A1 | | 11/2011 | Martin et al. |
| 2016/0130884 A1 | | 5/2016 | Kawai et al. |
| 2018/0340378 A1 | * | 11/2018 | Enderle ................... F16L 15/06 |

FOREIGN PATENT DOCUMENTS

| | | |
|---|---|---|
| GB | 2146085 A | 4/1985 |
| JP | S48-99717 A | 12/1973 |
| JP | S58-160687 A | 9/1983 |
| JP | S60-69388 A | 4/1985 |
| JP | H08184392 A | 7/1996 |
| JP | 2002524712 A | 8/2002 |
| JP | 2004238942 A | 8/2004 |
| JP | 2008527256 A | 7/2008 |
| WO | 2014199619 A1 | 12/2014 |
| WO | 2015083382 A1 | 6/2015 |
| WO | 2015105054 A1 | 7/2015 |

OTHER PUBLICATIONS

English Abstract & Family List of WO2015083382A1.
English Abstract & Family List of JP2008527256A.
English Abstract & Family List of JP1985069388A.
English Abstract & Family List of JPH08184392A.
English Abstract & Family List of JP1983160687A.
English Abstract & Family List of WO2014199619A1.
English Abstract & Family List of JP2002524712.
English Abstract & Family List of WO2015105054A1.

* cited by examiner $d_L = d_S$ $d_L \neq d_S$

THREADED CONNECTION

RELATED APPLICATION DATA

This application is a National Stage Application under 35 U.S.C. 371 of co-pending PCT application number PCT/JP2017/033565 designating the United States and filed Sep. 15, 2017; which claims the benefit of JP application number 2016-181175 and filed Sep. 16, 2016 each of which are hereby incorporated by reference in their entireties.

TECHNICAL FIELD

The present invention relates to a threaded connection.

BACKGROUND ART

In an oil well, a natural gas well, etc. (hereinafter also collectively referred to as "oil well"), an oil-well pipe, such as casing or tubing, that is used is a series of steel pipes connected with each other by means of threaded connections.

In recent years, especially in shale wells, mining by horizontal digging has become widespread to improve production efficiency. A threaded connection for oil-well pipes used in such applications is required to have high torque. To increase the torque performance of a threaded connection, U.S. Pat. No. 6,206,436 and JP 2013-507596, for example, each disclose a wedge-shaped thread with a thread width that gradually changes over the entire thread length (for example, in the pin, the width of the thread gradually decreases toward the tip, and the box has the reversed construction). Further, WO2015/083382 A1 discloses a similar technique, where the thread shape is trapezoidal.

SUMMARY OF THE INVENTION

Typically, a threaded connection is designed to exhibit required performances (sealability will be discussed as an example thereof in the following description) when torque is within a predetermined range. That is, if a torque exceeding the appropriate range is applied, this may impair sealability.

In view of this, for example, a threaded connection that requires high torque, as that of Patent Document 1, is designed to exhibit the appropriate sealability when made up with high torque. If such a threaded connection is made up with low torque, it will not exhibit the appropriate sealability. Further, in the case of a trapezoidal thread form such as that of WO2015/083382 A1, when the connection is made up with high torque, forces are applied to the male and female threads in such directions that they are separated from each other, and thus they can be easily disengaged.

Embodiments provide threaded connections with a wide range of torque at which a predetermined performance is achieved.

According to an embodiment, a threaded connection is a threaded connection for connecting pipes and includes a pin including a wedge male thread having a varying-thread-width portion and a box including a wedge female thread having a varying-thread-width portion. The male thread engages the female thread. The threaded connection is constructed such that a shoulder provided on the pin is not in contact with a shoulder provided on another member when a stab flank and a load flank of the male thread contact a stab flank and a load flank, respectively, of the female thread and, with a further rotation in a make-up direction, the shoulder provided on the pin is capable of contacting the shoulder provided on the other member before the threads yield.

The threaded connections according to embodiments widen the torque range in which a predetermined performance is achieved. This will achieve a wider range of applications of the threaded connections.

EMBODIMENTS FOR CARRYING OUT THE INVENTION

[Arrangement 1]

Figure 1:
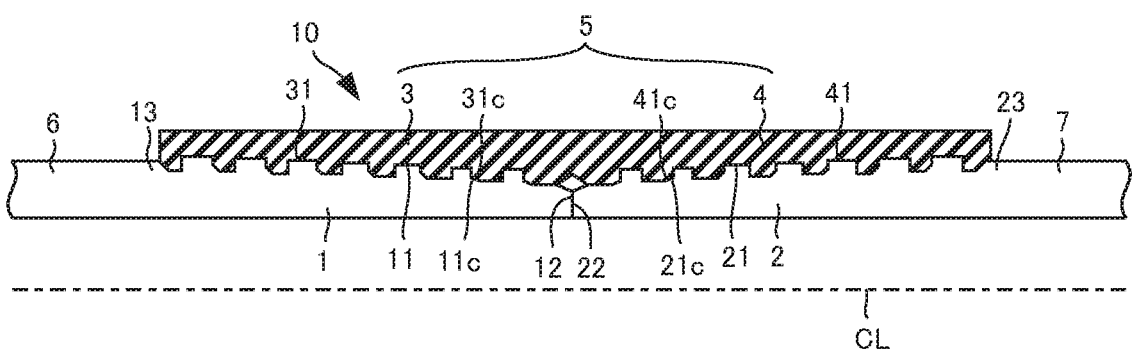
FIG. 1 is a longitudinal cross-sectional view of a threaded connection according to Embodiment 1.

According to an embodiment, a threaded connection is a threaded connection for connecting pipes and includes a pin including a wedge male thread having a varying-thread-width portion and a box including a wedge female thread having a varying-thread-width portion. The male thread engages the female thread. The threaded connection is constructed such that, when a stab flank and a load flank of the male thread contact a stab flank and a load flank, respectively, of the female thread, a shoulder provided on the pin is not in contact with a shoulder provided on another member, and, with a further rotation in a make-up direction, the shoulder provided on the pin is capable of contacting the shoulder provided on the other member before the threads yield.

In Arrangement 1, when both stab flanks and load flanks of the male thread contact stab flanks and load flanks, respectively, of the female thread torque increases from a locked-flank torque level to a shouldering torque level as stab flanks and load flanks of the male thread interfere with stab flanks and load flanks, respectively, of the female thread even when the shoulder provided on the pin is not in contact with a shoulder provided on another member, and, with a further rotation in the make-up direction, torque further increases above the shouldering torque level before the threads yield when the shoulder provided on the pin contacts the shoulder provided on the other member. Further, as stab flanks and load flanks of the male thread contact stab flanks and load flanks, respectively, of the female thread, sufficient sealing performance of the threads is provided. Further, since the male and female threads are wedge-shaped, the male thread of the pin is less likely to be disengaged from the female thread of the box, and thus torque can easily increase.

Thus, in the threaded connection according to an embodiment, the range of torque that provides a predetermined performance can be widened.

[Arrangement 2]

Starting from Arrangement 1, in the varying-thread-width portion, a stab flank, a crest and a load flank of the male thread contact a stab flank, a root and a load flank, respectively, of the female thread to provide sealability at the threaded connection.

In Arrangement 2, sufficient sealing performance can be provided in the threads.

[Arrangement 3]

Starting from Arrangement 1 or 2, the threaded connection fastens a pair of pipes using a coupling. The pin is provided on a pipe end of each of the pair of pipes, and includes a shoulder on its tip. The box is provided on each end of the coupling. The threaded connection is constructed such that, when stab flanks and load flanks of the male threads of the pins of the pair of pipes contact stab flanks and load flanks, respectively, of the female threads of the box, the shoulders of the pins of the pair of pipes are not in contact with each other, and, with a further rotation in the make-up direction, the shoulders of the pins of the pair of pipes are capable of contacting each other before the threads yield.

In Arrangement 3, when stab flanks and load flanks of the male threads of the pins provided on the pipe ends of a pair of pipes contact stab flanks and load flanks, respectively, of the female threads of the box, stab flanks and load flanks of the male threads interfere with stab flanks and load flanks, respectively, of the female threads such that torque increases from a locked-flank torque level to a shouldering torque level. Then, with a further rotation in the make-up direction, when the shoulders of the pins of the pair of pipes contact each other before the threads yield, torque further increases above the shouldering torque level.

Thus, in a coupling-type threaded connection, the range of torque that provides a predetermined performance can be widened.

[Arrangement 4]

In Arrangement 3, one of the pins of the pair of pipes further includes a pin female sealing surface provided on an inner periphery of its tip. The other pin further includes a pin male sealing surface provided on an outer periphery of its tip. The pin female sealing surface sealingly contacts the pin male sealing surface.

In arrangement 4, a seal via fitting adhesion of the pin male sealing surface to pin female sealing surface provides a higher sealing performance than a threaded connection without such a sealing surface, particularly against the internal pressure.

(Arrangement 5)

Starting from Arrangement 1 or 2, a shoulder is provided on a tip of the pin. A shoulder is provided on the box to correspond to the shoulder of the pin. The threaded connection is constructed such that, when a stab flank and a load flank of the male thread contact a stab flank and a load flank, respectively, of the female thread, the shoulder of the pin is not in contact with the shoulder of the box, and, with a further rotation in the make-up direction, the shoulder of the pin is capable of contacting the shoulder of the box before the threads yield.

In Arrangement 5, when stab flanks and load flanks of the male thread of the pin contact stab flanks and load flanks, respectively, of the female thread, stab flanks and load flanks of the male thread interfere with stab flanks and load flanks, respectively, of the female thread such that torque increases from a locked-flank torque level to a shouldering torque level. With a further rotation in the make-up direction, when the shoulder of the pin contacts the shoulder of the box before the threads yield, torque further increases above the shouldering torque level.

Thus, in an integral-type threaded connection, the range of torque that provides a predetermined performance can be widened.

[Arrangement 6]

Starting from Arrangement 1 or 2, the pin includes a plurality of male thread stages and an intermediate shoulder provided between the plurality of male thread stages. The box includes a plurality of female thread stages and an intermediate shoulder provided between the plurality of female thread stages to correspond to the intermediate shoulder of the pin. The threaded connection is constructed such that, when a stab flank and a load flank of a male thread of the pin provided on a pipe end of one of a pair of pipes contact a stab flank and a load flank, respectively, of a female thread, the intermediate shoulders of the pin and the box are not in contact with each other, and, with a further rotation in the make-up direction, the intermediate shoulders of the pin and the box are capable of contacting each other before the threads yield.

In Arrangement 6, when stab flanks and load flanks of a male thread of a pin provided on a pipe end of one pipe contact stab flanks and load flanks, respectively, of a female thread, stab flanks and load flanks of the male thread interfere with stab flanks and load flanks, respectively, of the female thread such that torque increases from a locked-flank torque level to a shouldering torque level and, with a further rotation in the make-up direction, torque further increases above the shouldering torque level when the intermediate shoulders of the pin and box contact each other before the threads yield.

Thus, in a threaded connection with a plurality of thread stages, the range of torque that provides a predetermined performance can be widened.

[Arrangement 7]

Starting from Arrangement 1 or 2, a shoulder is provided on a tip of the box, and a shoulder is provided on the pin to correspond to the shoulder of the box. The threaded connection is constructed such that, when a stab flank and a load flank of the male thread contact a stab flank and a load flank, respectively, of the female thread, the shoulders of the box and the pin are not in contact with each other, and, with a further rotation in the make-up direction, the shoulders of the box and the pin are capable of contacting each other before the threads yield.

In Arrangement 7, when stab flanks and load flanks of the male thread contact stab flanks and load flanks, respectively, of the female thread, stab flanks and load flanks of the male thread interfere with stab flanks and load flanks, respectively, of the female thread such that torque increases from a locked-flank torque level to a shouldering torque level, and, with a further rotation in the make-up direction, when the shoulders of the box and pin contact each other before the threads yield, the shoulders interfere with each other such that torque further increases above the shouldering level.

Thus, in a threaded connection in which a shoulder of the pin may contact a shoulder provided on the tip of the box, the range of torque that provides a predetermined performance can be widened.

[Arrangement 8]

Starting from one of Arrangements 1 to 7, the pin includes a pin sealing surface located closer to a pipe end and/or a pipe body than the male thread as determined along a pipe-axis direction, and the box includes a box sealing surface provided to correspond to the pin sealing surface. The pin sealing surface sealingly contacts the box sealing surface.

In Arrangement 8, the pin sealing surface and box sealing surface contact each other as the pin is screwed in and, after locked flank is reached, are in fitting adhesion to form a seal via metal-to-metal contact.

Thus, in a threaded connection, a seal via fitting adhesion between the pin sealing surface and box sealing surface provides a sealing performance higher than a threaded connection without a sealing surface.

[Arrangement 9]

In one of Arrangements 1 to 8, each of the male thread and the female thread further includes a constant-thread-width portion.

Figure 9:
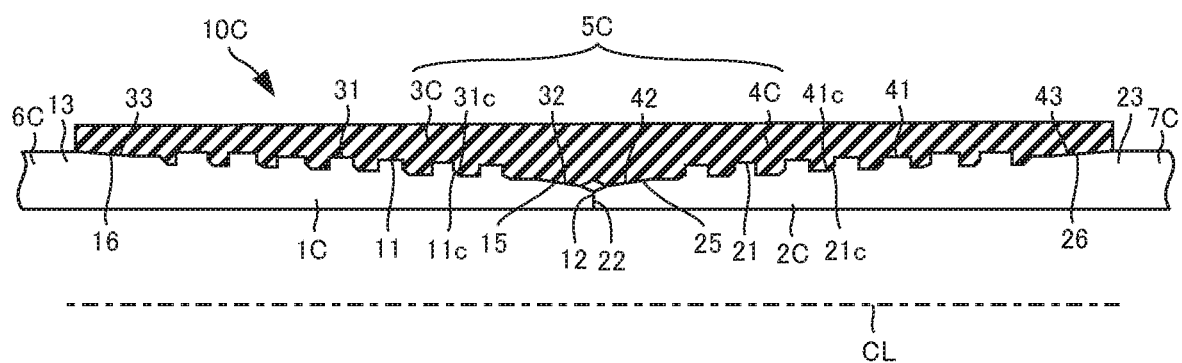
FIG. 9 is a longitudinal cross-sectional view of a threaded connection according to a third variation of Embodiment 1.

In FIG. 9, the cycle time for manufacturing the threads can be reduced.

Further, the area where stab flanks and load flanks of the male thread contact stab flanks and load flanks, respectively, of the female thread is smaller than that in a conventional threaded connection that only includes a varying-thread-width portion, thereby potentially improving the thread sealing performance due to an increase in the thread lock surface pressure.

Embodiments will be described in detail with reference to the drawings. The same or corresponding portions in the drawings are labeled with the same characters and their description will not be repeated.

[Embodiment 1]

FIG. 1 is a longitudinal cross-sectional view of a threaded connection according to Embodiment 1. FIG. 1 shows a portion of the longitudinal cross-sectional view of the connection of a pair of pipes that is located higher than the pipe axis CL; in reality, a mirror image of the longitudinal cross-sectional view shown in FIG. 1 with respect to the pipe axis CL is present below the pipe axis CL.

Referring to FIG. 1, the threaded connection 10 according to Embodiment 1 includes pins 1 and 2 and boxes 3 and 4.

The threaded connection 10 is a coupling-type threaded connection.

The pins 1 and 2 are provided on pipe ends of a pair of pipes 6 and 7 that are connected to each other.

The boxes 3 and 4 are provided on the ends, as determined along the pipe-axis CL direction, of a coupling 5 connecting the pipes 6 and 7.

The pin 1 includes, starting with the tip of the pipe 6 onward, a shoulder 12 and a male thread 11. The shoulder 12 is located on the tip of the pin 1. The male thread 11 is located between the shoulder 12 and base 13 of the pin 1 and is tapered. The tapering is 1/16, for example. The male thread 11 includes chamfered surfaces 11c.

The pin 2 includes, starting with the tip of the pipe 7 onward, a shoulder 22 and a male thread 21. The shoulder 22 is located on the tip of the pin 2. The male thread 21 is located between the shoulder 22 and base 23 of the pin 2 and is tapered. The tapering is 1/16, for example. The male thread 21 includes chamfered surfaces 21c.

The box 3 includes a female thread 31. The box 4 includes a female thread 41. The female thread 31 is tapered from the tip of the box 3 inward. The female thread 41 is tapered from the tip of the box 4 inward.

The female thread 31 includes chamfered surfaces 31c corresponding to the chamfered surfaces 11c of the male thread 11. The female thread 41 includes chamfered surfaces 41c corresponding to the chamfered surfaces 21c of the male thread 21.

The male thread 11 of the pin 1 and the female thread 31 of the box 3 are screwed into each other and thus made up, and the male thread 21 of the pin 2 and the female thread 41 of the box 4 are screwed into each other and thus made up.

During "locked flank", discussed further below, the tip of the pin 1 (i.e. shoulder 12) is not in contact with the tip of the pin 2 (i.e. shoulder 22). When, from this state, a further rotation in the make-up direction is applied, the tip of the pin 1 (i.e. shoulder 12) contacts the tip of the pin 2 (i.e. shoulder 22) before the threads (i.e. male thread 11 and female thread 31) yield (see right section of FIG. 2, discussed further below).

The tip of the pin 1 (i.e. shoulder 12) and the tip of the pin 2 (i.e. shoulder 22) are preferably shaped to be perpendicular to the pipe-axis CL direction.

As used herein, "shouldering torque" means the torque at the time at which the tip of the pin 1 (i.e. shoulder 12) contacts the tip of the pin 2 (i.e. shoulder 22) and the tip (i.e. shoulder 12) begins to interfere with the tip (i.e. shoulder 22).

Figure 2:
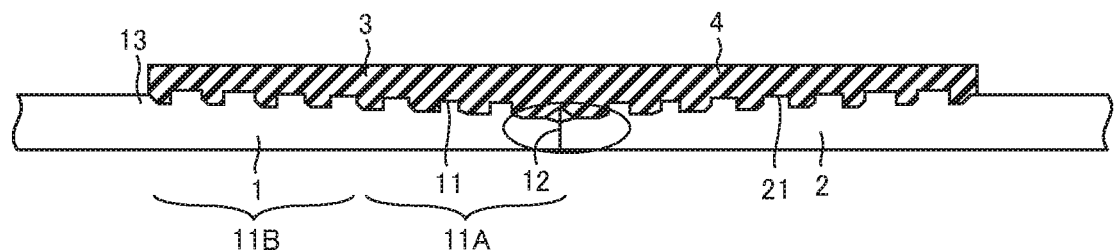
FIG. 2 shows enlarged longitudinal cross-sectional views of the male and female threads shown in FIG. 1.

FIG. 2 shows enlarged longitudinal cross-sectional views of the male and female threads 11 and 31 shown in FIG. 1. Referring to FIG. 2, the male and female threads 11 and 31 include a varying-thread-width portion 11A and a constant-thread-width portion 11B. The varying-thread-width portion 11A is located adjacent to the shoulder 12 of the pin 1. The constant-thread-width portion 11B is located adjacent to the base 13 of the pin 1. The length of the varying-thread-width portion 11A as measured in the pipe-axis CL direction is equal to the length of the constant-thread-width portion 11B as measured in the pipe-axis CL direction. Alternatively, the length of the varying-thread-width portion 11A as measured in the pipe-axis CL direction may be different from the length of the constant-thread-width portion 11B as measured in the pipe-axis CL direction.

The constant-thread-width portion 11B may begin, for example, at the fifth thread as counted from the tip of the pin 1.

In the male thread 11, the constant-thread-width portion 11B is a region with a constant thread-groove width. The varying-thread-width portion 11A is a region having a thread-groove width equal to the thread-groove width of the constant-thread-width portion 11B or larger and increasing gradually going from the constant-thread-width portion 11B toward the tip of the pin 1. On the other hand, in the female thread 31, the constant-thread-width portion 11B is a region with a constant thread width. The varying-thread-width portion 11A is a region with a thread width that is equal to the thread width of the constant-thread-width portion 11B or larger and increasing gradually going from the constant-thread-width portion 11B toward the center of the box 4 (i.e. portion corresponding to the tip of the pin 1). That is, in the varying-thread-width portion 11A, the stab lead ds for the stab flanks 111 is different from the load lead $d_L$ for the load flanks 112. On the other hand, in the constant-thread-width portion 11B, the stab lead ds for the stab flanks 111 is equal to the load lead $d_L$ for the load flanks 112. The stab lead ds and load lead $d_L$ will be described in detail further below.

In the varying-thread-width portion 11A, a stab flank 111 and a load flank 112 of the male thread 11 face a stab flank 311 and a load flank 312, respectively, of the female thread 31, and a thread crest 113 of the male thread 11 faces a thread root 313 of the female thread 31.

During locked flank, a stab flank 111 and a load flank 112 of the male thread 11 are in contact with a stab flank 311 and a load flank 312, respectively, of the female thread 31, and a thread crest 113 of the male thread 11 is in contact with a thread root 313 of the female thread 31. Thus, during locked flank, the male thread 11 of the varying-thread-width portion 11A is in contact with the female thread 31 without a gap relative to the female thread 3. This construction provides sufficient sealing performance in the threads.

In the constant-thread-width portion 11B, a stab flank 111 and a load flank 112 of the male thread 11 face a stab flank 311 and a load flank 312, respectively, of the female thread 31, and a thread crest 113 of the male thread faces a thread root 313 of the female thread 31.

During locked flank, a stab flank 111 of the male thread 11 has a gap 20 relative to a stab flank 311 of the female thread 31, a load flank 112 of the male thread 11 is in contact with a load flank 312 of the female thread 31, and a thread crest 113 of the male thread 11 is in contact with a thread root 311 of the female thread 31. Thus, during locked flank, the male thread 11 in the constant-thread-width portion 11B has a gap 20 relative to the female thread 31 on stab flanks 111.

In this construction, the area of the threaded connection 10 in which stab flanks 111 and load flanks 112 are in contact with stab flanks 311 and load flanks 312, respectively (also referred to as "thread lock area"), is smaller than that in a conventional threaded connection having only a varying-thread-width portion. Thus, the surface pressure on the thread lock area is larger than that in a threaded connection having only a varying-thread-width portion. This may potentially improve the sealing performance in the threads.

Further, since the threaded connection 10 includes a varying-thread-width portion 11A and a constant-thread-width portion 11B, the cycle time during manufacture can be shorter than that for a threaded connection having only a varying-thread-width portion. Further, since the varying-thread-width portion 11B and constant-thread-width portion 11B are provided, the difference between the minimum thread width and the maximum thread width in each of the male thread and female thread is smaller than in a threaded connection with only a varying-thread-width portion. This prevents a shear fracture from occurring at the base of the thread having the smallest thread width in each of the male and female threads.

In the varying-thread-width portion 11A and constant-thread-width portion 11B, the flank angle of the stab flanks 111 and the flank angle of the load flanks 112 are negative angles, that is, provide wedge threads. Flank angle means the angle between a plane perpendicular to the pipe-axis CL direction and the surface of a stab flank 111 (or surface of a load flank 112). In connection with the flank angle of the stab flanks 111, the counterclockwise direction is the positive direction; in connection with the flank angle of the load flanks 112, the clockwise direction is the positive direction. The negative angle may be in the range of −1° to −10°, for example. The flank angle of the stab flanks 111 may be equal to or different from the flank angle of the load flanks 112.

In the varying-thread-width portion 11A and constant-thread-width portion 11B, each of a thread crest 113 of the male thread 11 and a thread root 313 of the female thread 31 has the shape of a face corresponding to the periphery of a cylinder having a central axis aligned with the pipe axis CL. Alternatively, a thread crest 113 of the male thread 11 and a thread root 313 of the female thread 31 may have the shape of a face corresponding to the periphery of a truncated cone having a central axis aligned with the pipe axis CL.

The male thread 11 preferably includes chamfered surfaces 11c. The chamfered surfaces 11c is an inclined surface connecting a stab flank 111 and a root of the male thread 11. The female thread 31 preferably includes chamfered surfaces 31c corresponding to the chamfered surfaces 11c of the male thread 11.

In the varying-thread-width portion 11A, during locked flank, a chamfered surface 11c of the male thread 11 is in contact with a chamfered surface 31c of the female thread 31. On the other hand, in the constant-thread-width portion 11B, during locked flank, a chamfered surface 11c of the male thread 11 is not in contact with a chamfered surface 31c of the female thread 31.

Providing chamfered surfaces facilitates insertion of the pin and improves the sealability in the threads. The angle of the chamfered surfaces 11c is suitably in the range of 30° to 60° relative to the root of the male thread 11.

The male thread 21 of the pin 2 and the female thread 41 of the box 4 have the same construction as the male thread 11 of the pin 1 and the female thread 31 of the box 3, respectively.

Figure 3:
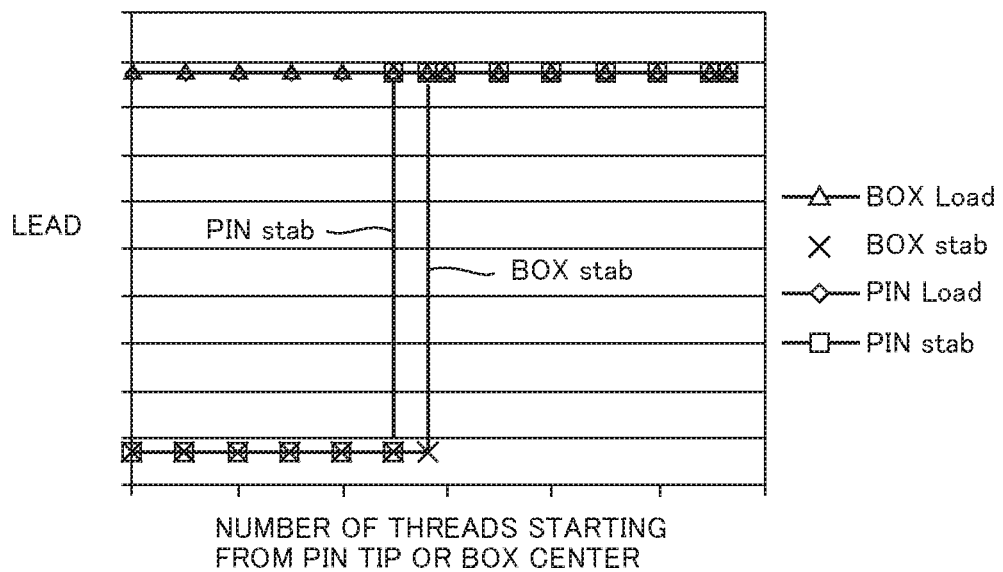
FIG. 3 is a graph showing the stab lead and the load lead of the pin and box.

FIG. 3 is a graph showing the stab lead and load lead of the pin and box. In the graph shown in FIG. 3, the vertical axis represents the magnitude of lead while the horizontal axis represents the number of threads as counted from the tip of the pin or the center of the box.

Figure 2A:
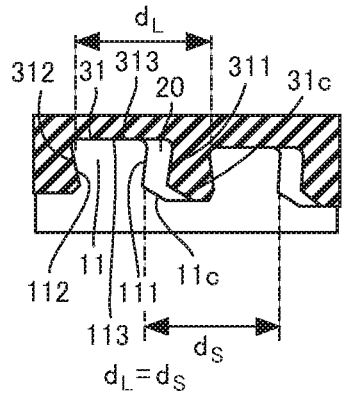
FIG. 2A is an enlarged longitudinal cross-sectional view of the constant-thread-width portion shown in FIG. 2.
Figure 2B:
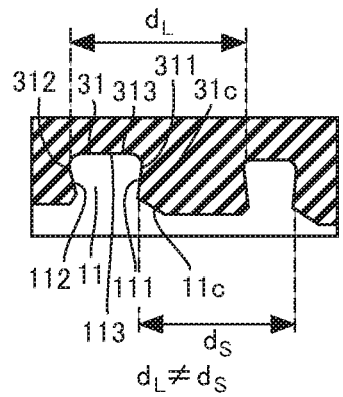
FIG. 2B is an enlarged longitudinal cross-sectional view of the varying-thread-width portion shown in FIG. 2.
Figure 2C:
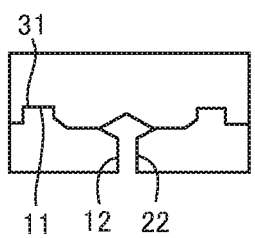
FIG. 2C is an enlarged longitudinal cross-sectional view of the shoulders and surrounding portions shown in FIG. 2 during locked flank.
Figure 2D:
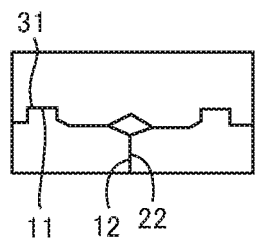
FIG. 2D is an enlarged longitudinal cross-sectional view of the shoulders and surrounding portions shown in FIG. 2, with a rotation in the make-up direction starting with locked flank.

The stab lead of the pin is the distance between adjacent stab flanks 111 of the male thread 11 as measured in the pipe-axis CL direction, as shown in FIGS. 2A and 2B. The load lead of the pin is the distance between adjacent load flanks 112 of the male thread 11 as measured in the pipe-axis CL direction, as shown in FIGS. 2A and 2B. The stab lead of the box is the distance between adjacent stab flanks 311 of the female thread 31 as measured in the pipe-axis CL direction. The load lead of the box is the distance between adjacent load flanks 312 of the female thread 31 as measured in the pipe-axis CL direction.

As shown in FIG. 3, in the tip portion of the pin 1, i.e. varying-thread-width portion 11A (FIG. 2B) of the male thread 11, the load lead is larger than the stab lead. Similarly, in the central portion of the box, i.e. varying-thread-width portion (i.e. portion corresponding to the varying-thread-width portion 11A of the male thread 11) of the female thread 31, the load lead is larger than the stab lead.

In the base portion of the pin 1, i.e. constant-thread-width portion 11B (FIG. 2A) of the male thread 11, the stab lead is equal to the load lead. Similarly, in the end portion of the box 3, i.e. constant-thread-width portion (i.e. portion corresponding to the constant-thread-width portion 11B of the male thread 11) of the female thread 31, the stab lead is equal to the load lead.

The load leads of the pin and box are constant over the entire thread length. On the other hand, the stab loads of both the pin and box change. That is, in each of the pin and box, the stab lead increases at the switch from the varying-thread-width portion to the constant-thread-width portion.

As will be apparent from FIG. 3, the position of the switch in the pin from the varying-thread-width portion to the constant-thread-width portion is not exactly the same as the position of the switch in the box from the varying-thread-width portion to the constant-thread-width portion. This is because screwing the pin into the box would be difficult if these positions in the pin and box were exactly the same.

Figure 4:
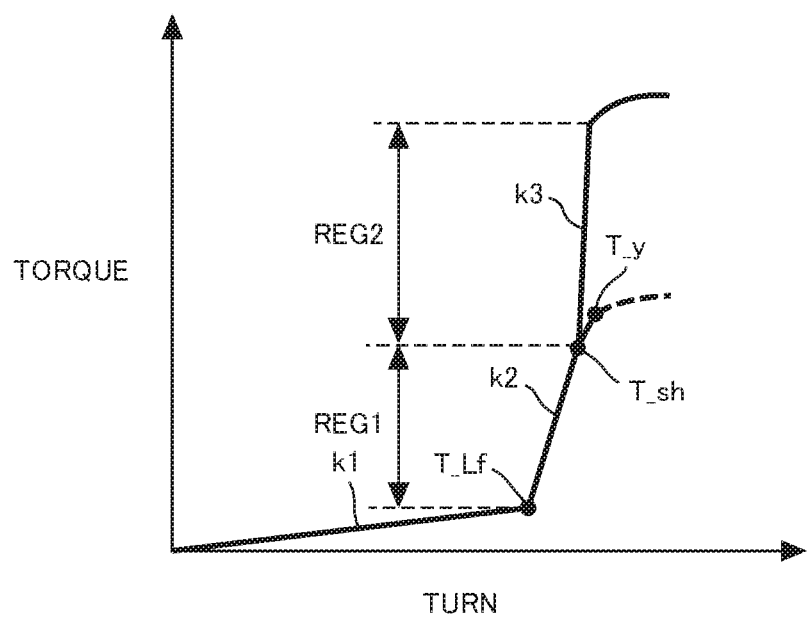
FIG. 4 is a torque chart for the threaded connection shown in FIG. 1 during make-up.

FIG. 4 is a torque chart for the threaded connection 10 shown in FIG. 1 during make-up. In FIG. 4, the vertical axis represents torque, while the horizontal axis represents turn (i.e. number of turns).

With reference to FIG. 4, a torque chart for the threaded connection 10 during make-up will be described presupposing that the male thread 21 of the pin 2 is screwed into the female thread 41 of the box 4 and the tip of the pin 2 (i.e. shoulder 22) is located at the center of the coupling 5 as determined along the pipe-axis CL direction.

Referring to FIG. 4, as the tightening (i.e. make-up) of the pipes proceeds, first, the male thread 11 of the pin 1 and the female thread 31 of the box 3 contact each other, and torque gradually increases along the straight line k1. Thereafter, when, in the varying-thread-width portion 11A of the pin 1, stab flanks 111 and load flanks 112 of the male thread 11 contact stab flanks 311 and load flanks 312 of the female thread 31 of the box 3, then, torque reaches the locked-flank torque level T_Lf.

As used herein, locked flank means the time at which stab flanks 111 and load flanks 112 of the male thread 11 of the pin 1 contact stab flanks 311 and load flanks 312 of the female thread 31 of the box 3.

As the tightening (i.e. make-up) of the pipes further proceeds from locked flank, the male thread 11 interferes with the female thread 31 and torque rapidly increases along the straight line k2.

At this time, in a threaded connection in which the tip of a pin does not contact the tip of another pin, the threads begin to yield when torque reaches the torque level T_y for thread yield (hereinafter also referred to as "yield torque level").

On the other hand, in the threaded connection 10, before torque reaches the yield torque level T_y, the tip of the pin 1 (i.e. shoulder 12) contacts the tip of the pin 2 (shoulder 22), and the tip (i.e. shoulder 12) and the tip (shoulder 22) begin to interfere with each other (that is, torque reaches the shouldering torque level T_sh). Thereafter, as the tightening (make-up) of the pipes proceeds, torque further rapidly increases along the curve k3.

In the threaded connection 10, in the region REG1 from the locked-flank torque level T_Lf to the shouldering torque level T_sh, torque increases as the male thread 11 of the pin 1 interferes with the female thread 31 of the box 3 in the varying-thread-width portion 11A, and, in the region REG2 above the shouldering torque level T_sh, torque increases as the tip of the pin 1 (i.e. shoulder 12) interferes with the tip of the pin 2 (i.e. shoulder 22) before the threads (i.e. male and female threads 11 and 31) yield.

Thus, the threaded connection 10 achieves high torque performance as the tip of the pin 1 (i.e. shoulder 12) contacts the tip of the pin 2 (i.e. shoulder 22) before the threads (i.e. male and female threads 11 and 31) yield, and the tip of the pin 1 (i.e. shoulder 12) interferes with the tip of the pin 2 (i.e. shoulder 22).

As discussed above, the tip of the pin 1 (i.e. shoulder 12) and the tip of the pin 2 (i.e. shoulder 22) are shaped to be perpendicular to the pipe-axis CL direction such that the tip of the pin 1 (i.e. shoulder 12) properly interferes with the tip of the pin 2 (i.e. shoulder 22), thereby achieving high torque performance.

Torque in the region REG1 will be hereinafter also referred to as "thread interference torque", and torque in the region REG2 "shoulder interference torque".

Figure 5:
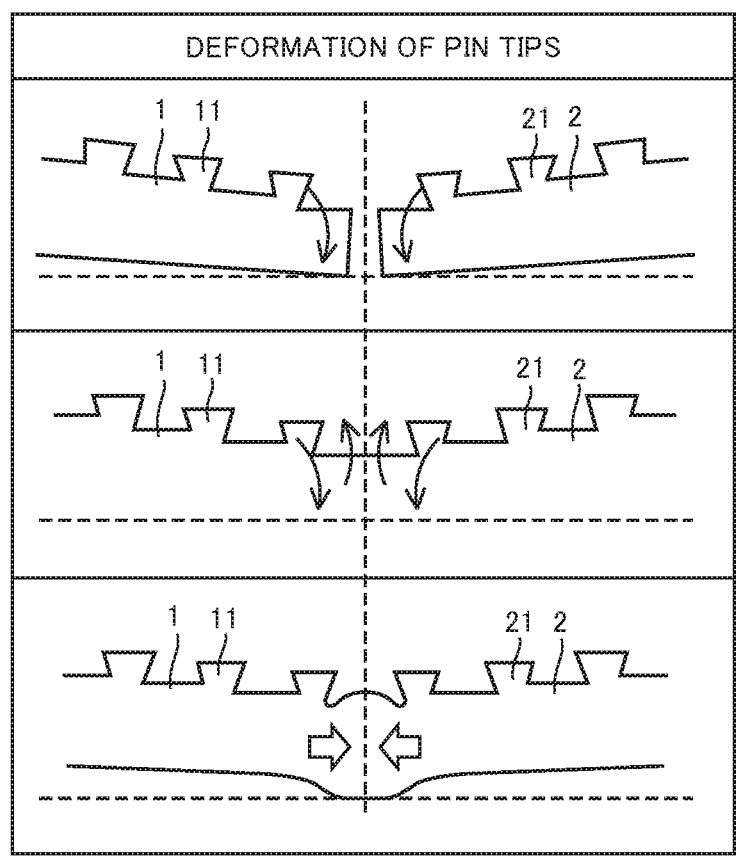
FIG. 5 shows longitudinal cross-sectional views of the tip portions of the pins of the threaded connection, showing the behavior of the pins being deformed as make-up proceeds.

FIG. 5 shows longitudinal cross-sectional views of the tip portions of the pins 1 and 2 of the threaded connection 10, showing the behavior of the pins 1 and 2 being deformed as make-up proceeds. Referring to the top section of FIG. 5, when torque is in the region REG1 shown in FIG. 4, the tip of the pin 1 (i.e. shoulder 12) of the threaded connection 10 is not in contact with the tip of the pin 2 (i.e. shoulder 22). Torque is generated as the male thread 11 of the pin 1 interferes with the female thread 31 of the box 3. At this moment, the tips of the pins 1 and 2 contract downward due to the thread interference (see top section of FIG. 5).

As tightening further proceeds and the pin 1 contacts the pin 2, that is, when torque is in the region REG2 shown in FIG. 4, torque is generated as the male thread 11 of the pin 1 interferes with the female thread 31 of the box 3 and, in addition, the tip of the pin 1 (i.e. shoulder 12) interferes with the tip of the pin 2 (i.e. shoulder 22). At this moment, the interference between the shoulders 12 and 22 generates a reaction force against the downward contraction due to the thread interference (see middle section of FIG. 5).

As tightening further proceeds, the shoulder 12 of the pin 1 and the shoulder 22 of the pin 2 yield due to shoulder compression (see bottom section of FIG. 5). For some threaded-connection constructions, the threads may yield before the shoulders 12 and 22 yield.

Figure 6A:
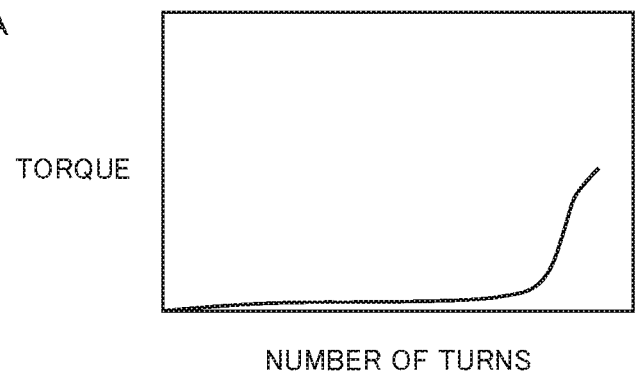
FIG. 6A shows a graph of the relationship between torque and the number of turns, without shoulder contact.
Figure 6B:
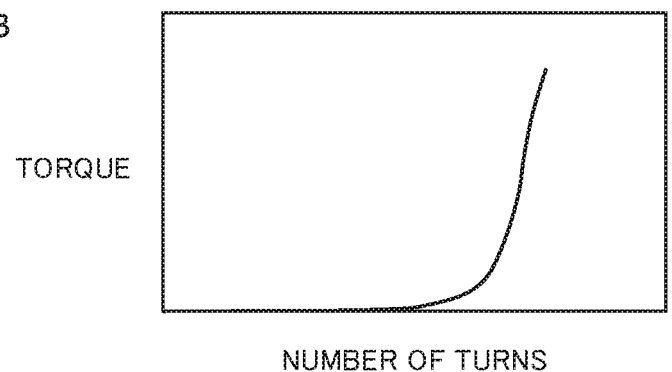
FIG. 6B shows a graph of the relationship between torque and the number of turns, with shoulder contact.

As can be assumed from FIGS. 6A and 6B, to provide high torque, it is preferable to have a construction where the tip of the pin 1 (i.e. shoulder 12) contacts the tip of the pin 2 (i.e. shoulder 22) after the torque derived from the interference between the male and female threads becomes as large as possible. For example, if the threaded connection is used in an oil-well pipe with an outer diameter of 5½ inches, the distance d between the tip of the pin 1 (i.e. shoulder 12) and the tip of the pin 2 (i.e. shoulder 22) found when the locked-flank torque level T_Lf is reached is preferably in the range of 1.15 mm to 1.55 mm.

<Inventive Example 1>

Steel pipes were used to experimentally make threaded connections with the construction shown in FIG. 1, that is, where the tips of the pins are not in contact with each other during locked flank and, with a further rotation, the tips of the pins contact each other before the threads yield (hereinafter referred to as "with pin contact"), and the relationship between torque and the number of turns during make-up was measured. For comparison, a threaded connection was experimentally made where the tip of the pin is somewhat shorter and the tips of the pins are not in contact before the threads yield (hereinafter referred to as "without pin contact"), and a similar measurement was conducted. The results are shown in FIGS. 6A and 6B.

FIGS. 6A and 6B show graphs of the relationship between torque and the number of turns, one with shoulder contact and the other without shoulder contact. In each of FIGS. 6A and 6B, the vertical axis represents torque and the horizontal axis represents the number of turns.

FIG. 6A shows the relationship between torque and the number of turns in a connection without pin contact of Comparative Example 1. FIG. 6B shows the relationship between torque and the number of turns in a connection with pin contact of Inventive Example 1.

Without pin contact, the torque in the threaded connection rapidly increased when the number of turns became above a certain value. When the number of turns further increased, the rate of increase in torque decreased (see FIG. 6A).

On the other hand, with pin contact, similar to FIG. 6A, the torque in the threaded connection rapidly increased when the number of turns became above a certain value and, when the number of turns further increased, the rate of increase in torque decreased. The torque level at which the rate of increase in torque began to decrease was twice that without pin contact or more (see FIG. 6B).

<Inventive Example 2>

Machining was performed to fabricate the male thread 11 of the threaded connection shown in FIG. 1, and the machining time was measured. In the threaded connection of Inventive Example 2, a varying-thread-width portion 11A and a constant-thread-width portion 11B were fabricated to represent the male thread 11. The varying-thread-width portion 11A and the constant-thread-width portion 11B had the same length as measured in the pipe-axis direction. That is, a half of the male thread 11 was the constant-thread-width portion 111. As a result, in the male thread 11, the maximum thread-groove width was twice the minimum thread-groove width.

Machining for creating the male thread 11 was performed using a cutting tool with a size corresponding with the minimum thread-groove width. As discussed above, in the male thread 11, the maximum thread-groove width was twice the minimum thread-groove width.

Consequently, when the number of cutting passes in the pipe-axis direction for the thread groove having the minimum thread-groove width is represented as 1, the number of cutting passes in the pipe-axis direction for the thread groove having the maximum thread-groove width (i.e. maximum number of cutting passes) was two. The total number of cutting passes in the pipe-axis direction was 14.

For comparison, machining was performed to fabricate a male thread different from the above-described one, and the machining time was measured. In the threaded connection of Comparative Example 2, only a varying-thread-width portion was fabricated to represent the male thread, and no constant thread-width portion was provided. The length of the male thread of Comparative Example 2 as measured in the pipe-axis direction was substantially equal to the length, as measured in the pipe-axis direction, of the male thread 11 of Inventive Example 2. The thread-groove width of the male thread of Comparative Example 2 changed at substantially the same rate as the thread-groove width of the varying-thread-width portion 11A of Inventive Example 2. As a result, in the male thread, the maximum thread-groove width was four times the minimum thread-groove width.

Machining for producing the male thread was performed using a cutting tool with a size corresponding with the minimum thread-groove width. In the male thread, the maximum thread-groove width was four times the minimum thread-groove width and thus the maximum number of cutting passes was four. The total number of cutting passes in the pipe-axis direction was 28.

(Evaluation)

Figure 6C:
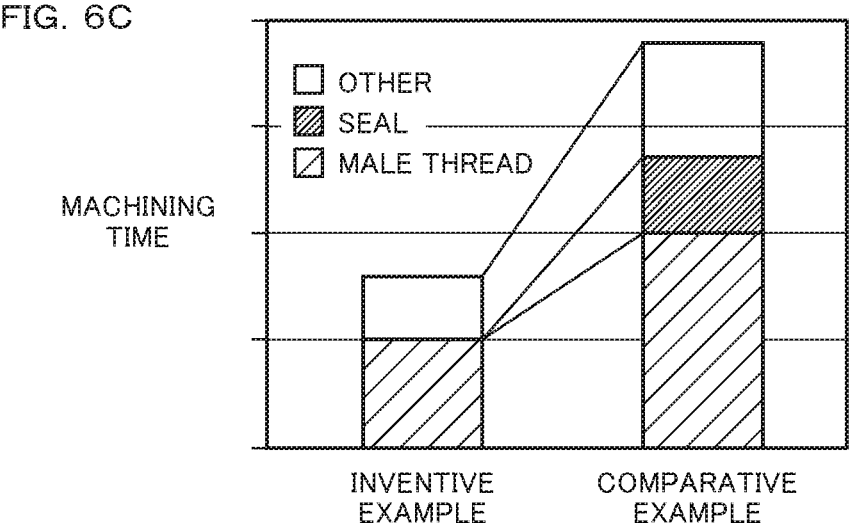
FIG. 6C is a graph of the machining time for a male thread depending on whether there is a constant-thread-width portion.

FIG. 6C shows a graph of the machining time for each of the threaded connections of Inventive Example 2 and Comparative Example 2. The maximum number of cutting passes and the total number of cutting passes for the male thread 11 of Inventive Example 2 were half the maximum number of cutting passes and the total number of cutting passes for the male thread of Comparative Example 2. Consequently, as shown in FIG. 7, the machining time for the male thread 11 of Inventive Example 2 was about half the machining time for the male thread of Comparative Example 2.

Thus, it was verified that providing a constant-thread-width portion 11B on the male thread 11 reduces the machining time for the male thread compared with the male thread without a constant thread-width portion. The same effect is expected from the female thread 31 having a construction corresponding to that of the male thread 11.

Figure 7:
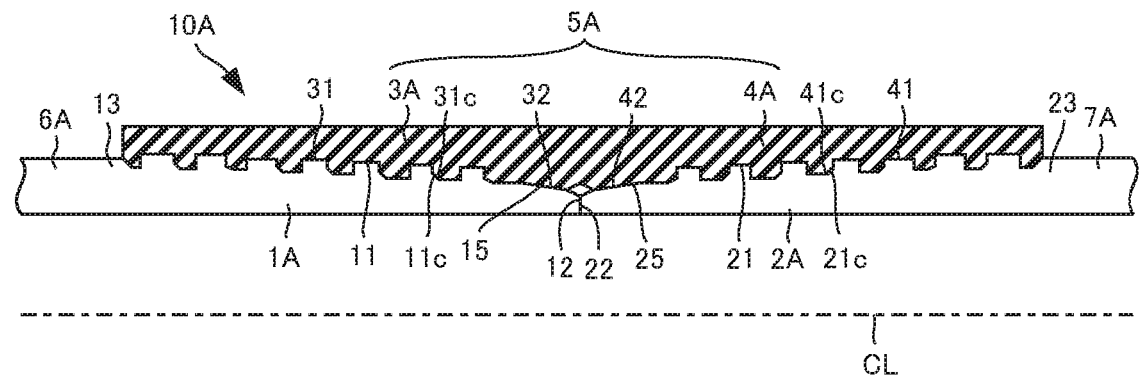
FIG. 7 is a longitudinal cross-sectional view of a threaded connection according to a first variation of Embodiment 1.

FIG. 7 is longitudinal cross-sectional view of a threaded connection according to a first variation of Embodiment 1. FIG. 7 shows a portion of the longitudinal cross-sectional view of the connection of a pair of pipes that is located higher than the pipe axis CL; in reality, a mirror image of the longitudinal cross-sectional view shown in FIG. 7 with respect to the pipe axis CL is present below the pipe axis CL.

Referring to FIG. 7, the threaded connection 10A according to the first variation of Embodiment 1 includes pins 1A and 2A and boxes 3A and 4A.

A pair of pipes 6A and 7A are to be connected, and the pin 1A is provided on a pipe end of one pipe 6A. The pin 2A is provided on a pipe end of the other pipe 7A.

The box 3A is provided on one end of a coupling 5A that connects the pipes 6A and 7A, and the box 4A is provided on the other end of the coupling 5A.

The pin 1A has a construction obtained by adding a sealing surface 15 (i.e. pin sealing surface) to the pin 1. The sealing surface 15 is located between the male thread 11 and shoulder 12. The sealing surface 15 is tapered. More exactly, the sealing surface 15 has the shape of a face corresponding to the periphery of a truncated cone (i.e. a straight line in the longitudinal cross-sectional view shown in FIG. 7), or the shape of a face corresponding to the periphery of a solid of revolution obtained by rotating a curve such as an arc about the pipe axis CL (i.e. a curve in the longitudinal cross-sectional view), or a combination thereof.

The pin 2A has a construction obtained by adding a sealing surface 25 to the pin 2. The sealing surface 25 is located between the male thread 21 and shoulder 22. The sealing surface 25 is tapered. More exactly, the sealing surface 25 has the shape of a face corresponding to the periphery of a truncated cone, or the shape of a face corresponding to the periphery of a solid of revolution obtained by rotating a curve such as an arc about the pipe axis CL, or a combination thereof.

The box 3A has a construction obtained by adding to the box 3 a sealing surface 32 (i.e. box sealing surface) to correspond to the sealing surface 15 of the pin 1A. The sealing surface 32 is located inward of the female thread 31 with respect to the coupling 5A. The sealing surface 32 is tapered. More exactly, the sealing surface 32 has the shape of a face corresponding to the periphery of a truncated cone, or the shape of a face corresponding to the periphery of a solid of revolution obtained by rotating a curve such as an arc about the pipe axis CL, or a combination thereof. The box sealing surface 32 may have the same shape as the pin sealing surface 15, or may have a different shape. As discussed above, each of the pin sealing surface 15 and box sealing surface 32 may take three shapes, and thus there are nine possible combinations.

The box 4A has a construction obtained by adding to the box 4 a sealing surface 42 to correspond to the sealing surface 25 of the pin 2A. The sealing surface 42 is located inward of the female thread 41 with respect to the coupling 5A. The sealing surface 42 is tapered. More exactly, the sealing surface 42 has the shape of a face corresponding to the periphery of a truncated cone, or the shape of a face corresponding to the periphery of a solid of revolution obtained by rotating a curve such as an arc about the pipe axis CL, or a combination thereof. The box sealing surface 42 may have the same shape as the pin sealing surface 25, or may have a different shape. As discussed above, each of the pin sealing surface 25 and box sealing surface 42 may take three shapes, and thus there are nine possible combinations.

As the pin 1A is screwed in, the sealing surfaces 15 and 32 contact each other and, after locked flank is reached, adhere to each other to form a seal via metal-to-metal contact.

As the pin 2A is screwed in, the sealing surfaces 25 and 42 contact each other and, after locked flank is reached, adhere to each other to form a seal via metal-to-metal contact.

The threaded connection 10A is also constructed such that, when stab flanks 111 and load flanks 112 of the male thread 11 of the pin 1A contact stab flanks 311 and load flanks 312, respectively, of the female thread 31 of the box 3A, the shoulder 12 (i.e. tip) of the pin 1A is not in contact with the shoulder 22 (i.e. tip) of the pin 2A and, with a further rotation in the make-up direction, the shoulder 12 (i.e. tip) of the pin 1A is capable of contacting the shoulder 22 (i.e. tip) of the pin 2A before the threads (i.e. male and female threads 11 and 31) yield.

Thus, the threaded connection 10A also provides the torque chart shown in FIG. 4.

The threaded connection 10A provides a higher sealing performance than the threaded connection 10 since it includes a set of seals. Further, in view of this, the sealing performance in the threads may be lower than that of the threaded connection 10.

On the other hand, as tightening proceeds, the seals of the threaded connection 10A may yield before the threads or shoulders yield. Thus, the range of torque that leads to the threads providing stable performance may be potentially wider in the threaded connection 10.

Figure 8:
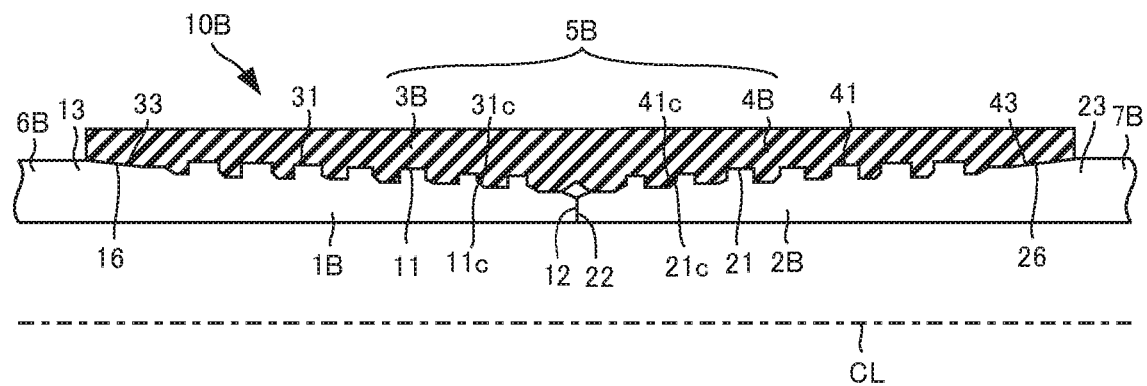
FIG. 8 is a longitudinal cross-sectional view of a threaded connection according to a second variation of Embodiment 1.

FIG. 8 is a longitudinal cross-sectional view of a threaded connection according to a second variation of Embodiment 1. FIG. 8 shows a portion of the longitudinal cross-sectional view of the connection of a pair of pipes that is located higher than the pipe axis CL; in reality, a mirror image of the longitudinal cross-sectional view shown in FIG. 8 with respect to the pipe axis CL is present below the pipe axis CL.

Referring to FIG. 8, the threaded connection 10B according to the second variation of Embodiment 1 includes pins 1B and 2B and boxes 3B and 4B.

A pair of pipes 6B and 7B are to be connected, and the pin 1B is provided on a pipe end of one pipe 6B. The pin 2B is provided on a pipe end of the other pipe 7B.

The box 3B is provided on one end of a coupling 5B that connects the pipes 6B and 7B, and the box 4B is provided on the other end of the coupling 5B.

The pin 1B has a construction obtained by adding a sealing surface 16 (i.e. pin sealing surface) to the pin 1. The sealing surface 16 is located between the male thread 11 and base 13. The sealing surface 16 is tapered. More exactly, the sealing surface 16 has the shape of a face corresponding to the periphery of a truncated cone, or the shape of a face corresponding to the periphery of a solid of revolution obtained by rotating a curve such as an arc about the pipe axis CL, or a combination thereof.

The pin 2B has a construction obtained by adding a sealing surface 26 to the pin 2. The sealing surface 26 is located between the male thread 21 and base 23. The sealing surface 26 is tapered. More exactly, the sealing surface 26 has the shape of a face corresponding to the periphery of a truncated cone, or the shape of a face corresponding to the periphery of a solid of revolution obtained by rotating a curve such as an arc about the pipe axis CL, or a combination thereof.

The box 3B has a construction obtained by adding to the box 3 a sealing surface 33 (i.e. box sealing surface) to correspond to the sealing surface 16 of the pin 1B. The sealing surface 33 is located closer to the associated tip of the box 3B than the female thread 31 is. The sealing surface 33 is tapered. More exactly, the sealing surface 33 has the shape of a face corresponding to the periphery of a truncated cone, or the shape of a face corresponding to the periphery of a solid of revolution obtained by rotating a curve such as an arc about the pipe axis CL, or a combination thereof. The box sealing surface 33 may have the same shape as the pin sealing surface 16, or may have a different shape. As discussed above, each of the pin sealing surface 16 and the box sealing surface 33 may take three shapes, and thus there are nine possible combinations.

The box 4B has a construction obtained by adding to the box 4 a sealing surface 43 to correspond to the sealing surface 26 of the pin 2B. The sealing surface 43 is located closer to the associated tip of the box 4B than the female thread 41 is. The sealing surface 43 is tapered. More exactly, the sealing surface 43 has the shape of a face corresponding to the periphery of a truncated cone, or the shape of a face corresponding to the periphery of a solid of revolution obtained by rotating a curve such as an arc about the pipe axis CL, or a combination thereof. The box sealing surface 43 may have the same shape as the pin sealing surface 26, or may have a different shape. As discussed above, each of the pin sealing surface 26 and box sealing surface 43 may take three shapes, and thus there are nine possible combinations.

As the pin 1B is screwed in, the sealing surfaces 16 and 33 contact each other and, after locked flank is reached, adhere to each other to form a seal via metal-to-metal contact.

As the pin 2B is screwed in, the sealing surfaces 26 and 43 contact each other and, after locked flank is reached, adhere to each other to form a seal via metal-to-metal contact.

The threaded connection 10B is also constructed such that, when stab flanks 111 and load flanks 112 of the male thread 11 of the pin 1B contact stab flanks 311 and load flanks 312, respectively, of the female thread 31 of the box 3B, the shoulder 12 (i.e. tip) of the pin 1B is not in contact with the shoulder 22 (i.e. tip) of the pin 2B and, with a further rotation in the make-up direction, the shoulder 12 (i.e. tip) of the pin 1B is capable of contacting the shoulder 22 (i.e. tip) of the pin 2B before the threads (i.e. male and female threads 11 and 31) yield.

Thus, the threaded connection 10B also provides the torque chart shown in FIG. 4.

The threaded connection 10B provides a higher sealing performance than the threaded connection 10 since it includes a set of seals. Further, in view of this, the sealing performance in the threads may be lower than that of the threaded connection 10.

On the other hand, as tightening proceeds, the seals of the threaded connection 10B may yield before the threads or shoulders yield. Thus, the range of torque that leads to the threads providing stable performance may be potentially wider in the threaded connection 10.

FIG. 9 is a longitudinal cross-sectional view of a threaded connection according to a third variation of Embodiment 1. FIG. 9 shows a portion of the longitudinal cross-sectional view of the connection of a pair of pipes that is located higher than the pipe axis CL; in reality, a mirror image of the longitudinal cross-sectional view shown in FIG. 9 with respect to the pipe axis CL is present below the pipe axis CL.

Referring to FIG. 9, the threaded connection 10C according to the third variation of Embodiment 1 includes pins 1C and 2C and boxes 3C and 4C.

A pair of pipes 6C and 7C are to be connected, and the pin 1C is provided on a pipe end of one pipe 6C. The pin 2C is provided on a pipe end of the other pipe 7C.

The box 3C is provided on one end of a coupling 5C that connects the pipes 6C and 7C, and the box 4C is provided on the other end of the coupling 5C.

The pin 1C has a construction obtained by adding the sealing surfaces 15 and 16 discussed above (i.e. pin sealing surfaces) to the pin 1.

The pin 2C has a construction obtained by adding the sealing surfaces 25 and 26 discussed above to the pin 2.

The box 3C has a construction obtained by adding the sealing surfaces 32 and 33 discussed above (i.e. box sealing surfaces) to the box 3.

The box 4C has a construction obtained by adding the sealing surfaces 42 and 43 discussed above to the box 4.

As the pin 1C is screwed in, the sealing surfaces 15 and 32 contact each other and, after locked flank is reached, adhere to each other to form a seal via metal-to-metal contact. As the pin 1C is screwed in, the sealing surfaces 16 and 33 also contact each other and, after locked flank is reached, adhere to each other to form a seal via metal-to-metal contact.

As the pin 2C is screwed in, the sealing surfaces 25 and 42 contact each other and, after locked flank is reached, adhere to each other to form a seal via metal-to-metal contact. As the pin 2C is screwed in, the sealing surfaces 26 and 43 also contact each other and, after locked flank is reached, adhere to each other to form a seal via metal-to-metal contact.

The threaded connection 10C is also constructed such that, when stab flanks 111 and load flanks 112 of the male thread 11 of the pin 1C contact stab flanks 311 and load flanks 312, respectively, of the female thread 31 of the box 3C, the shoulder 12 (i.e. tip) of the pin 1C is not in contact with the shoulder 22 (i.e. tip) of the pin 2C and, with a further rotation in the make-up direction, the shoulder 12 (i.e. tip) of the pin 1C is capable of contacting the shoulder 22 (i.e. tip) of the pin 2C before the threads (i.e. male and female threads 11 and 31) yield.

Thus, the threaded connection 10C also provides the torque chart shown in FIG. 4.

The threaded connection 10C provides a higher sealing performance than the threaded connection 10 since it includes two sets of seals. In view of this, the sealing performance in the threads may be lower than that of the threaded connection 10.

On the other hand, as tightening proceeds, the seals of the threaded connection 10C may yield before the threads or shoulders yield. Thus, the range of torque that leads to the threads providing stable performance may be potentially wider in the threaded connection 10.

Figure 9A:
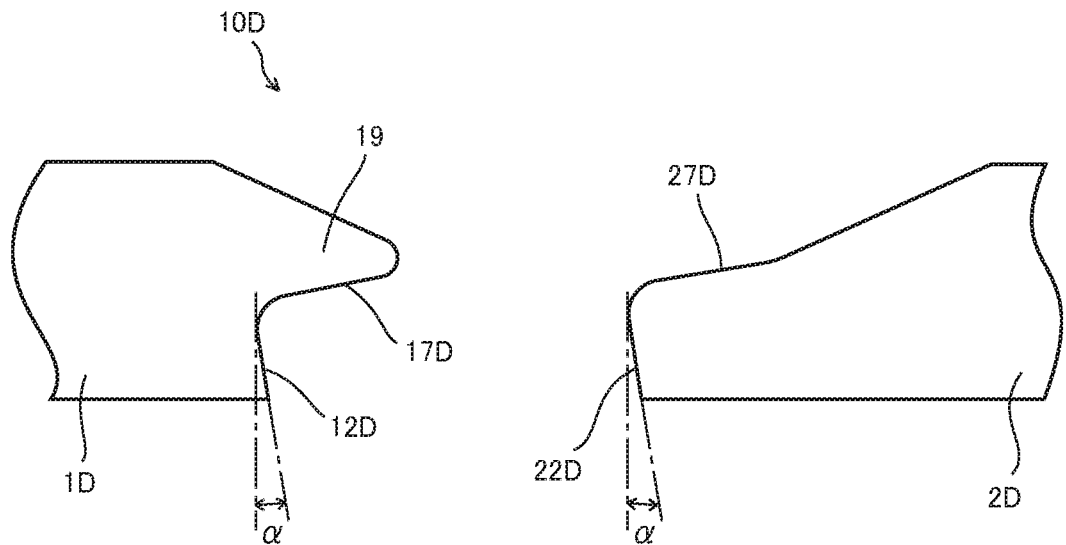
FIG. 9A is an enlarged longitudinal cross-sectional view of the tips of the pins of a threaded connection according to a fourth variation of Embodiment 1.

FIG. 9A is an enlarged longitudinal cross-sectional view of the tips of the pins of a threaded connection according to a fourth variation of Embodiment 1. The fourth variation basically has the same construction as Embodiment 1 except that the construction of the tips of the two pins are different from that of Embodiment 1 shown in FIG. 1. FIG. 9A shows the threaded connection as before the completion of make-up.

Referring to FIG. 9A, in a threaded connection 10D according to the fourth variation of Embodiment 1, one pin 1D includes a pin female sealing surface 17D provided on the inner periphery of its tip and a shoulder 12D provided on the tip. The other pin 2D includes a pin male sealing surface 27D provided on the periphery of its tip and a shoulder surface 22D provided on the tip.

More specifically, the pin 1D includes a protrusion 19 extending in the pipe-axis direction from the shoulder 12D. The pin female sealing surface 17D is provided on the inner periphery of the protrusion 19. The pin female sealing surface 17D is tapered. More exactly, the pin female sealing surface 17D has the shape of a face corresponding to the periphery of a truncated cone, or the shape of a face corresponding to the periphery of a solid of revolution obtained by rotating a curve such as an arc about the pipe axis CL, or a combination thereof.

In the pin 2D, the pin male sealing surface 27D is located between the male thread 21 and shoulder 22D. The pin male sealing surface 27D is tapered. More exactly, the pin male sealing surface 27D has the shape of a face corresponding to the periphery of a truncated cone, or the shape of a face corresponding to the periphery of a solid of revolution obtained by rotating a curve such as an arc about the pipe axis CL, or a combination thereof. As discussed above, each of the pin female sealing surface 17D and pin male sealing surface 27D may take three shapes, and thus there are nine possible combinations.

As the pins 1D and 2D are screwed in, the sealing surfaces 17D and 27D contact each other and, after each of the pins 1D and 2D reaches locked flank, adhere to each other to form a seal via metal-to-metal contact.

The threaded connection 10D according to the fourth variation is also constructed such that, when stab flanks 111 and load flanks 112 of the male thread 11 of the pin 1D contact stab flanks 311 and load flanks 312, respectively, of the female thread 31 of the box 3D, the shoulder 12D of the pin 1D is not in contact with the shoulder 22D of the pin 2D and, with a further rotation in the make-up direction, the shoulder 12D of the pin 1D is capable of contacting the shoulder 22D of the pin 2D before the threads (i.e. male and female threads 11 and 31) yield.

Thus, the threaded connection 10D also provides the torque chart shown in FIG. 4.

The shoulder angle α of the shoulder 22D may be in the range of 0° to −20°, for example. Correspondingly, the shoulder angle α of the shoulder 12D may be in the range of 0° to +20°. The shoulder angle α is the angle between the plane perpendicular to the pipe-axis CL direction and the shoulder surface forming the shoulder. Where the perpendicular plane passes through the upper edge of the shoulder surface (i.e. end of the outer periphery of the pin), the shoulder angle is positive if the lower edge of the shoulder surface (i.e. end of the inner periphery of the pin) is located forward with respect to the pin relative to the perpendicular plane, and is negative if the lower edge is located rearward with respect to the pin (i.e. farther in the direction opposite to the direction toward the tip of the pin). Preferably, the shoulder 22 D forms a slightly negative angle. A shoulder 22D with a negative angle improves the sealability of the sealing surface over a shoulder with a right angle (i.e. shoulder angle=0°).

[Embodiment 2]

Figure 10:
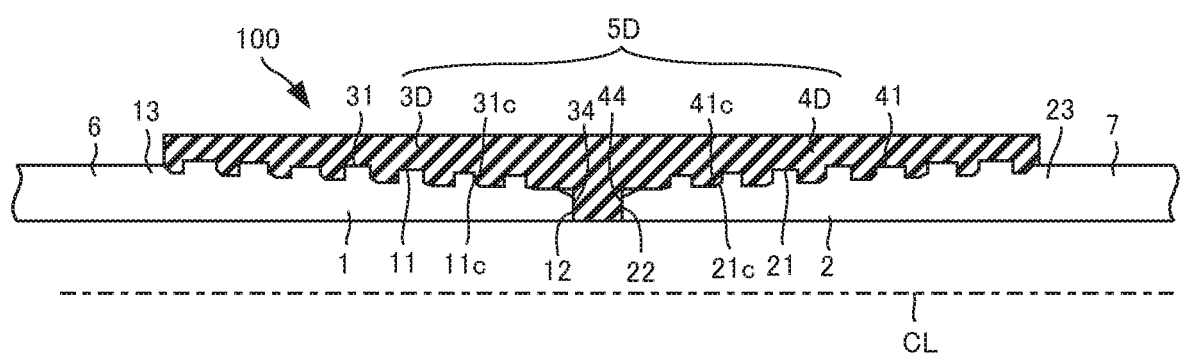
FIG. 10 is a longitudinal cross-sectional view of a threaded connection according to Embodiment 2.

FIG. 10 is a longitudinal cross-sectional view of a threaded connection according to Embodiment 2. FIG. 10 shows a portion of the longitudinal cross-sectional view of the connection of a pair of pipes that is located higher than the pipe axis CL; in reality, a mirror image of the longitudinal cross-sectional view shown in FIG. 10 with respect to the pipe axis CL is present below the pipe axis CL.

Referring to FIG. 10, the threaded connection 100 according to Embodiment 2 includes pins 1 and 2 and boxes 3D and 4D.

The threaded connection 100 is a coupling-type threaded connection.

The pins 1 and 2 are as described above.

The box 3D is provided on one end of a coupling 5D that connects a pair of pipes 6 and 7, and the box 4D is provided on the other end of the coupling 5D.

The box 3D has a construction obtained by adding a shoulder 34 to the box 3. The box 4D has a construction obtained by adding a shoulder 44 to the box 4.

The shoulder 34 is located inward of the female thread 31 with respect to the coupling 5D. The shoulder 44 is located inward of the female thread 41 with respect to the coupling 5D.

The shoulders 34 and 44 are preferably shaped to be perpendicular to the pipe-axis CL direction.

When locked flank is reached through screw-in of the pin 1, the tip of the pin 1 (i.e. shoulder 12) is not in contact with the shoulder 34 of the box 3D. When, from this state, a further rotation in the make-up direction is applied, the tip of the pin 1 (i.e. shoulder 12) contacts the shoulder 34 of the box 3D before the threads (i.e. male and female threads 11 and 31) yield.

That is, the tip of the pin 1 (i.e. shoulder 12) is not in contact with the shoulder 34 of the box 3D when torque is in the region REG1 shown in FIG. 4, and is in contact with the shoulder 34 of the box 3D when torque is in the region REG2 shown in FIG. 4.

Thus, the threaded connection 100 is constructed such that the member contacted by the tip of the pin 1 (i.e. shoulder 12) when torque is in the region REG2 shown in FIG. 4 is the shoulder 34 of the box 3D in lieu of the tip of the pin 2 (i.e. shoulder 22) of the threaded connection 10.

Thus, the threaded connection 100 also provides the torque chart shown in FIG. 4.

When locked flank is reached through screw-in of the pin 2, the tip of the pin 2 (i.e. shoulder 22) is not in contact with the shoulder 44 of the box 4D; when, starting from locked flank, a further rotation in the make-up direction is applied, the tip of the pin 2 (i.e. shoulder 22) contacts the shoulder 44 of the box 4D before the threads (i.e. male and female threads 21 and 41) yield. Thus, the pin 2 and box 4D form a connection with the same construction as the pin 1 and box 3D.

Figure 11:
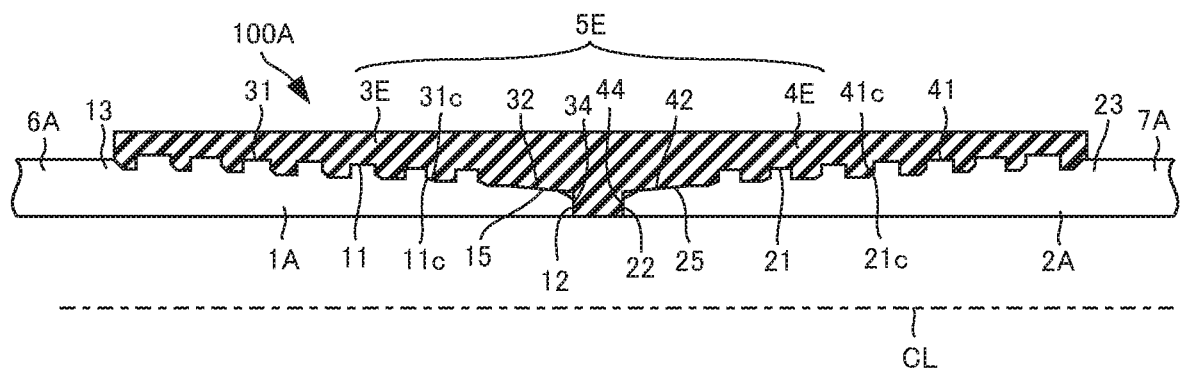
FIG. 11 is a longitudinal cross-sectional view of a threaded connection according to a first variation of Embodiment 2.

FIG. 11 is a longitudinal cross-sectional view of a threaded connection according to a first variation of Embodiment 2. FIG. 11 shows a portion of the longitudinal cross-sectional view of the connection of a pair of pipes that is located higher than the pipe axis CL; in reality, a mirror image of the longitudinal cross-sectional view shown in FIG. 11 with respect to the pipe axis CL is present below the pipe axis CL.

Referring to FIG. 11, the threaded connection 100A according to a first variation of Embodiment 2 includes pins 1A and 2A and boxes 3E and 4E.

The pins 1A and 2A are as described in connection with FIG. 7.

The box 3E has a construction obtained by adding a sealing surface 32 to the box 3D described in connection with FIG. 10. The sealing surface 32 is provided to correspond to the sealing surface 15 of the pin 1A. The sealing surface 32 is located between the female thread 31 and shoulder 34. As a result, the box 3E is composed of the female thread 31, sealing surface 32 and shoulder 34 arranged in this order beginning with one pipe end of the coupling 5E.

The box 4E has a construction obtained by adding a sealing surface 42 to the box 4D described in connection with FIG. 10. The sealing surface 42 is provided to correspond to the sealing surface 25 of the pin 2A. The sealing surface 42 is located between the female thread 41 and shoulder 44. As a result, the box 4E is composed of the female thread 41, sealing surface 42 and shoulder 44 arranged in this order beginning with the other pipe end of the coupling 5E.

The sealing surfaces 32 and 42 are shaped as described in connection with FIG. 7.

As the pin 1A is screwed in, the sealing surfaces 15 and 32 contact each other and, after locked flank is reached, adhere to each other to form a seal via metal-to-metal contact.

As the pin 2A is screwed in, the sealing surfaces 25 and 42 also contact each other and, after locked flank is reached, adhere to each other to form a seal via metal-to-metal contact.

Each shoulder preferably forms a slightly negative angle (for example, $-5°$ to $-20°$). In implementations where a sealing surface is present near the shoulder, the sealability of the sealing surfaces improves if each shoulder forms a negative angle, rather than being vertical.

The threaded connection 100A is also constructed such that, when stab flanks 111 and load flanks 112 of the male thread 11 of the pin 1A contact stab flanks 311 and load flanks 312, respectively, of the female thread 31 of the box 3E, the tip of the pin 1A (i.e. shoulder 12) is not in contact with the shoulder 34 of the box 3E and, with a further rotation in the make-up direction, the tip of the pin 1A (i.e. shoulder 12) is capable of contacting the shoulder 34 of the box 3E before the threads (i.e. male and female threads 11 and 31) yield.

Thus, the threaded connection 100A also provides the torque chart shown in FIG. 4.

The threaded connection 100A provides a higher sealing performance than the threaded connection 100 since it includes a set of seals. Further, in view of this, the sealing performance in the threads may be lower than that of the threaded connection 100.

On the other hand, as tightening proceeds, the seals of the threaded connection 100A may yield before the threads or shoulders yield. Thus, the range of torque that leads to the threads providing stable performance may be potentially wider in the threaded connection 100.

When locked flank is reached through screw-in of the pin 2A, the tip of the pin 2A (i.e. shoulder 22) is not in contact with the shoulder 44 of the box 4E; when, starting from locked flank, a further rotation in the make-up direction is applied, the tip of the pin 2A (i.e. shoulder 22) contacts the shoulder 44 of the box 4E before the threads (i.e. male and female threads 21 and 41) yield. Thus, the pin 2A and box 4E form a threaded connection with the same construction as the threaded connection 100A.

Figure 12:
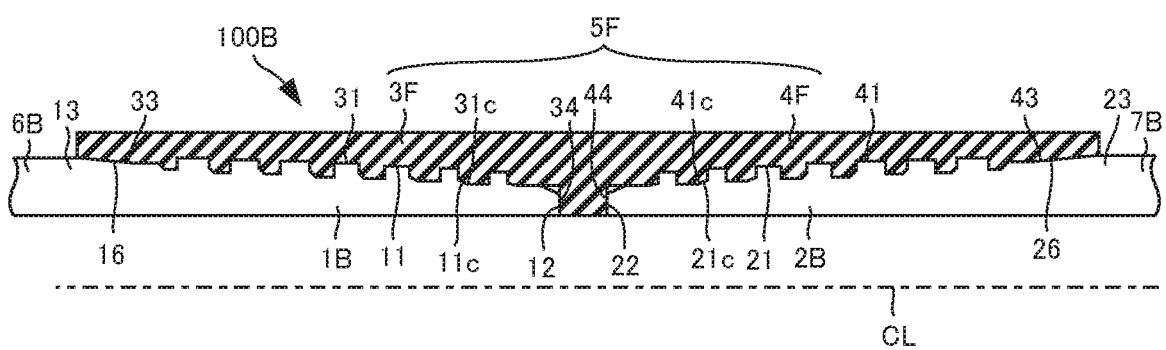
FIG. 12 is a longitudinal cross-sectional view of a threaded connection according to a second variation of Embodiment 2.

FIG. 12 is a longitudinal cross-sectional view of a threaded connection according to a second variation of Embodiment 2. FIG. 12 shows a portion of the longitudinal cross-sectional view of the connection of a pair of pipes that is located higher than the pipe axis CL; in reality, a mirror image of the longitudinal cross-sectional view shown in FIG. 12 with respect to the pipe axis CL is present below the pipe axis CL.

Referring to FIG. 12, the threaded connection 100B according to a second variation of Embodiment 2 includes pins 1B and 2B and boxes 3F and 4F.

The pins 1B and 2B are as described in connection with FIG. 8.

The box 3F has a construction obtained by adding, to the box 3D described in connection with FIG. 10, a sealing surface 33 (i.e. box sealing surface) to correspond to the sealing surface 16 of the pin 1B. The sealing surface 33 is provided to correspond to the sealing surface 16 of the pin 1B. The sealing surface 33 is located closer to one pipe end of the coupling 5F than the female thread 31 is. As a result, the box 3F is composed of the sealing surface 33, female thread 31 and shoulder 34 arranged in this order beginning with one pipe end of the coupling 5F.

The box 4F has a construction obtained by adding, to the box 4D described in connection with FIG. 10, a sealing surface 43 (box sealing surface) to correspond to the sealing surface 26 of the pin 2B. The sealing surface 43 is provided to correspond to the sealing surface 26 of the pin 2B. The sealing surface 43 is located closer to the other pipe end of the coupling 5F than the female thread 41 is. As a result, the box 4F is composed of the sealing surface 43, female thread 41 and shoulder 44 arranged in this order beginning with the other pipe end of the coupling 5F.

The sealing surfaces 33 and 43 are shaped as described in connection with FIG. 8.

As the pin 1B is screwed in, the sealing surfaces 16 and 33 contact each other and, after locked flank is reached, adhere to each other to form a seal via metal-to-metal contact.

As the pin 2B is screwed in, the sealing surfaces 26 and 43 also contact each other and, after locked flank is reached, adhere to each other to form a seal via metal-to-metal contact.

The threaded connection 100B is also constructed such that, when stab flanks 111 and load flanks 112 of the male thread 11 of the pin 1B contact stab flanks 311 and load flanks 312, respectively, of the female thread 31 of the box 3F, the tip of the pin 1B (i.e. shoulder 12) is not in contact with the shoulder 34 of the box 3F and, with a further rotation in the make-up direction, the tip of the pin 1B (i.e. shoulder 12) is capable of contacting the shoulder 34 of the box 3F before the threads (i.e. male and female threads 11 and 31) yield.

Thus, the threaded connection 100B also provides the torque chart shown in FIG. 4.

The threaded connection 100B provides a higher sealing performance than the threaded connection 100 since it includes a set of seals. Further, in view of this, the sealing performance in the threads may be lower than that of the threaded connection 100.

On the other hand, as tightening proceeds, the seals of the threaded connection 100B may yield before the threads or shoulders yield. Thus, the range of torque that leads to the threads providing stable performance may be potentially wider in the threaded connection 100.

When locked flank is reached through screw-in of the pin 2B, the tip of the pin 2B (i.e. shoulder 22) is not in contact with the shoulder 44 of the box 4F; when, starting from locked flank, a further rotation in the make-up direction is applied, the tip of the pin 2B (i.e. shoulder 22) contacts the shoulder 44 of the box 4F before the threads (i.e. male and female threads 21 and 41) yield. Thus, the pin 2B and box 4F form a threaded connection with the same construction as the threaded connection 100B.

Figure 13:
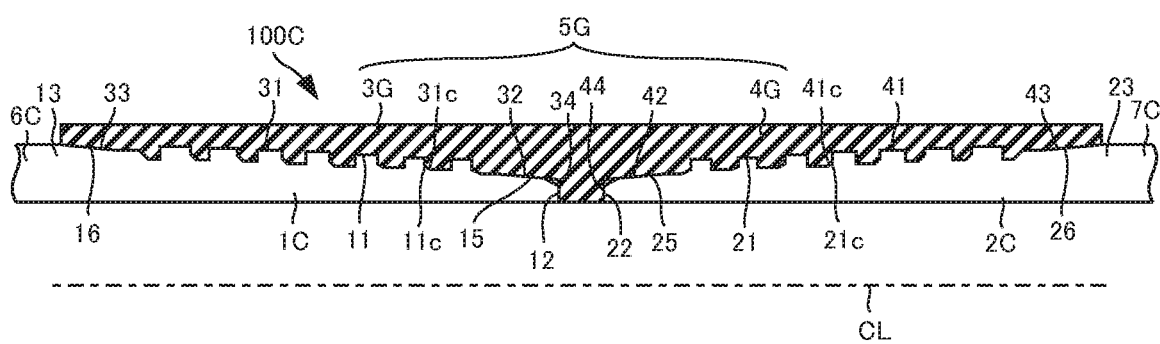
FIG. 13 is a longitudinal cross-sectional view of a threaded connection according to a third variation of Embodiment 2.

FIG. 13 is a longitudinal cross-sectional view of a threaded connection according to a third variation of Embodiment 2. FIG. 13 shows a portion of the longitudinal cross-sectional view of the connection of a pair of pipes that is located higher than the pipe axis CL; in reality, a mirror image of the longitudinal cross-sectional view shown in FIG. 13 with respect to the pipe axis CL is present below the pipe axis CL.

Referring to FIG. 13, the threaded connection 100C according to a third variation of Embodiment 2 includes pins 1C and 2C and boxes 3G and 4G.

The pins 1C and 2C are as described in connection with FIG. 9.

The box 3G has a construction obtained by adding, to the box 3D described in connection with FIG. 10, sealing surfaces 32 and 33 (i.e. box sealing surfaces) to correspond to the sealing surfaces 15 and 16 of the pin 1C. The sealing surface 32 is located between the female thread 31 and shoulder 34, and the sealing surface 33 is located closer to one pipe end of the coupling 5G than the female thread 31 is. As a result, the box 3G is composed of the sealing surface 33, female thread 31, sealing surface 32 and shoulder 34 arranged in this order beginning with one pipe end of the coupling 5G.

The box 4G has a construction obtained by adding, to the box 3D described in connection with FIG. 10, sealing surfaces 42 and 43 (i.e. box sealing surfaces) to correspond to the sealing surfaces 25 and 26 of the pin 2C. The sealing surface 42 is located between the female thread 41 and shoulder 44, and the sealing surface 43 is provided on the other pipe end of the coupling 5G. As a result, the box 4G is composed of the sealing surface 43, female thread 41, sealing surface 42 and shoulder 44 arranged in this order beginning with the other pipe end of the coupling 5G.

As the pin 1C is screwed in, the sealing surfaces 15 and 32 contact each other and, after locked flank is reached, adhere to each other to form a seal via metal-to-metal contact. As the pin 1C is screwed in, the sealing surfaces 16 and 33 also contact each other and, after locked flank is reached, adhere to each other to form a seal via metal-to-metal contact.

As the pin 2C is screwed in, the sealing surfaces 25 and 42 contact each other and, after locked flank is reached, adhere to each other to form a seal via metal-to-metal contact. As the pin 2C is screwed in, the sealing surfaces 26 and 43 also contact each other and, after locked flank is reached, adhere to each other to form a seal via metal-to-metal contact.

Each shoulder preferably forms a slightly negative angle (for example, $-5°$ to $-20°$). In implementations where a sealing surface is present near the shoulder, the sealability of the sealing surfaces improves if each shoulder forms a negative angle.

The threaded connection 100C is also constructed such that, when stab flanks 111 and load flanks 112 of the male thread 11 of the pin 1C contact stab flanks 311 and load flanks 312, respectively, of the female thread 31 of the box 3G, the tip of the pin 1C (i.e. shoulder 12) is not in contact with the shoulder 34 of the box 3G and, with a further rotation in the make-up direction, the tip of the pin 1C (i.e. shoulder 12) is capable of contacting the shoulder 34 of the box 3G before the threads (i.e. male and female threads 11 and 31) yield.

Thus, the threaded connection 100C also provides the torque chart shown in FIG. 4.

The threaded connection 100C provides a higher sealing performance than the threaded connection 100 since it includes two sets of seals. In view of this, the sealing performance in the threads may be lower than that of the threaded connection 100.

On the other hand, as tightening proceeds, the seals of the threaded connection 100C may yield before the threads or shoulders yield. Thus, the range of torque that leads to the threads providing stable performance may be potentially wider in the threaded connection 100.

When locked flank is reached through screw-in of the pin 2C, the tip of the pin 2C (i.e. shoulder 22) is not in contact with the shoulder 44 of the box 4G; when, starting from locked flank, a further rotation in the make-up direction is applied, the tip of the pin 2C (i.e. shoulder 22) contacts the shoulder 44 of the box 4G before the threads (i.e. male and female threads 21 and 41) yield. Thus, the pin 2C and box 4G form a connection with the same construction as the threaded connection 100C.

[Embodiment 3]

Figure 14:
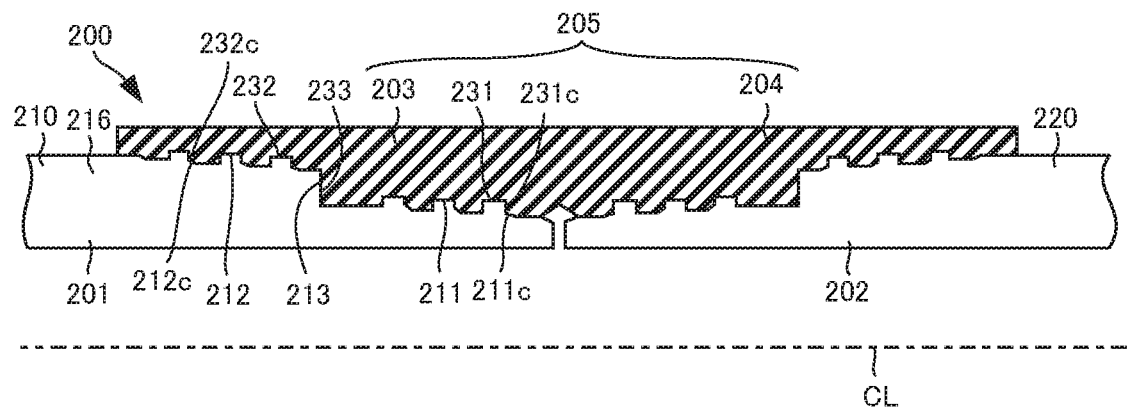
FIG. 14 is a longitudinal cross-sectional view of a threaded connection according to Embodiment 3.

FIG. 14 is a longitudinal cross-sectional view of a threaded connection according to Embodiment 3. FIG. 14 shows a portion of the longitudinal cross-sectional view of the connection of a pair of pipes that is located higher than the pipe axis CL; in reality, a mirror image of the longitudinal cross-sectional view shown in FIG. 14 with respect to the pipe axis CL is present below the pipe axis CL.

Referring to FIG. 14, the threaded connection 200 according to Embodiment 3 includes pins 201 and 202 and boxes 203 and 204.

A pair of pipes 210 and 220 are to be connected, and the pin 201 is provided on a pipe end of one pipe 210.

The pin 202 is provided on a pipe end of the other pipe 220.

The box 203 is provided on one end of a coupling 205 that connects the pipes 210 and 220, while the box 204 is provided on the other end of the coupling 205.

The pin 201 includes a male thread 211, an intermediate shoulder 213 and a male thread 212, in this order beginning with the tip.

The male thread 211 is located closer to the tip of the pin 201 than the intermediate shoulder 213 of the pin 201 as determined along the pipe-axis CL direction, and is tapered. The male thread 212 is located between the intermediate shoulder 213 and the base 216 as determined along the pipe-axis CL direction, and is tapered. The male thread 211 is provided on a taper surface with a smaller radius than the taper surface on which the male thread 212 is provided.

The intermediate shoulder 213 is located between the male threads 211 and 212 as determined along the pipe-axis CL direction.

Thus, the pin 201 has a double-stage thread construction.

The pin 202 has the same construction as the pin 201.

The box 203 includes a female thread 231, an intermediate shoulder 233 and a female thread 232, in this order beginning with the interior of the coupling 205. The female thread 231 is provided to correspond to the male thread 211 of the pin 201. The female thread 232 is provided to correspond to the male thread 212 of the pin 201. The intermediate shoulder 233 is provided to correspond to the intermediate shoulder 213 of the pin 201.

Thus, the box 203 has a double-stage thread construction corresponding to the thread construction of the pin 201.

The box 204 has the same construction as the box 203.

Each of the male threads 211 and 212 of the pin 201 has the same construction as the male thread 11 discussed above. Thus, each of the male threads 211 and 212 has a varying-thread-width portion 11A and a constant-thread-width portion 11B, and is shaped to be a wedge thread (see FIG. 2).

Each of the female threads 231 and 232 of the box 203 has the same construction as the female thread 31 discussed above.

In the threaded connection 200, preferably, the male thread 211 includes chamfered surfaces 211c, the male thread 212 includes chamfered surfaces 212c, the female thread 231 includes chamfered surfaces 231c, and the female thread 232 includes chamfered surfaces 232c. The chamfered surfaces 211c and 212c are the same as the chamfered surfaces 11c discussed above, and the chamfered surfaces 231c and 232c are the same as the chamfered surfaces 31c discussed above. Providing chamfered surfaces facilitates insertion of the pin and improves the sealability in the threads.

The male thread 211 of the pin 201 and the female thread 231 of the box 203 are screwed into each other and thus made up. The male thread 212 of the pin 201 and the female thread 232 of the box 203 are screwed into each other and thus made up.

When the male thread 211 has been screwed into the female thread 231 and the male thread 212 has been screwed into the female thread 232, during locked flank, the intermediate shoulder 213 of the pin 201 is not in contact with the intermediate shoulder 233 of the box 203. When, from this state, a further rotation in the make-up direction is applied, the intermediate shoulder 213 of the pin 201 contacts the intermediate shoulder 233 of the box 203 before the threads (i.e. male threads 211 and 212 and female threads 231 and 232) yield.

The intermediate shoulder 213 of the pin 201 and the intermediate shoulder 233 of the box 203 are preferably shaped to be perpendicular to the pipe-axis CL direction.

Figure 15A:
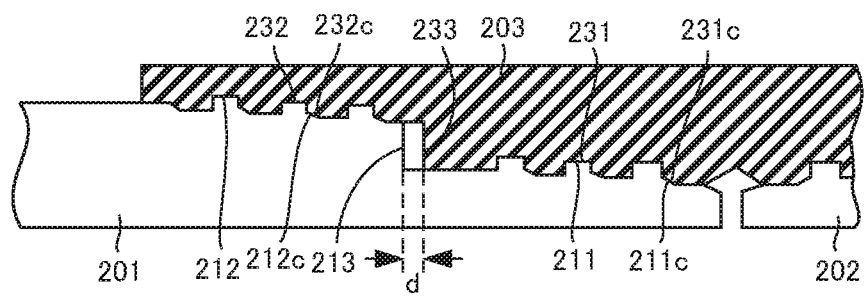
FIG. 15A shows a longitudinal cross-sectional view of the threaded connection shown in FIG. 14, with a thread interference torque and with the intermediate shoulders being not in contact with each other.
Figure 15B:
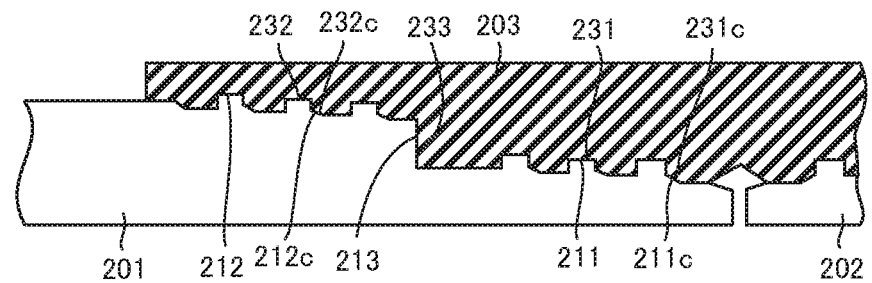
FIG. 15B shows a longitudinal cross-sectional view of the threaded connection shown in FIG. 14, with a thread interference torque and with the intermediate shoulders being in contact with each other.

FIGS. 15A and 15B show longitudinal cross-sectional views of the threaded connection 200 shown in FIG. 14, one with a thread interference torque and the other with a shoulder interference torque.

Referring to FIG. 15A, when a thread interference torque is produced, that is, when stab flanks 111 and load flanks 212 of the male threads 211 and 212 are in contact with stab flanks 311 and load flanks 312 of the female threads 231 and 232 of the box 203, the intermediate shoulder 213 of the pin 201 of the threaded connection 200 is not in contact with the intermediate shoulder 233 of the box 203. The distance between the intermediate shoulders 213 and 233 is d discussed above. In this case, the tip of the pin 201 is not in contact with the tip of the pin 202.

On the other hand, referring to FIG. 15B, when a shoulder interference torque is produced, the intermediate shoulder 213 of the pin 201 of the threaded connection 200 contacts the intermediate shoulder 233 of the box 203 before the threads (i.e. male threads 211 and 212 and female threads 231 and 232) yield. In this case, too, the tip of the pin 201 is not in contact with the tip of the pin 202.

Thus, the threaded connection 200 is constructed such that, when stab flanks 111 and load flanks 112 of the male threads 211 and 212 of the pin 201 contact stab flanks 311 and load flanks 312, respectively, of the female threads 231 and 232 of the box 203, the intermediate shoulder 213 of the pin 201 is not in contact with the intermediate shoulder 233 of the box 203, and, with a further rotation in the make-up direction, the intermediate shoulder 213 of the pin 201 is capable of contacting the intermediate shoulder 233 of the box 203 before the threads (i.e. male threads 211 and 212 and female threads 231 and 232) yield.

Thus, the threaded connection 200 also provides the torque chart shown in FIG. 4.

Thus, in the threaded connection 200, in the region REG1 from the locked-flank torque level T_Lf to the shoulder torque level T_sh, torque increases as the male threads 211 and 212 of the pin 201 interfere with the female threads 231 and 232, respectively, of the box 203, and, in the region REG2 above the shouldering torque level T_sh, torque increases as the intermediate shoulder 213 of the pin 201 interferes with the intermediate shoulder 233 of the box 203 before the threads (i.e. male threads 211 and 212 and female threads 231 and 232) yield.

Thus, the threaded connection 200 achieves high torque performance as the intermediate shoulder 213 of the pin 201 contacts the intermediate shoulder 233 of the box 203 before the threads (i.e. male threads 211 and 212 and female threads 231 and 232) yield and the intermediate shoulder 213 of the pin 201 interferes with the intermediate shoulder 233 of the box 203.

As discussed above, the intermediate shoulder 213 of the pin 201 and the intermediate shoulder 233 of the box 203 are shaped to be perpendicular to the pipe-axis CL direction such that the intermediate shoulder 213 of the pin 201 properly interferes with the intermediate shoulder 233 of the box 203, thereby easily achieving high torque performance.

When the pin 202 is screwed into the box 204, a thread interference torque and a shoulder interference torque are produced in the same manner as when the pin 201 is screwed into the box 203.

Figure 16:
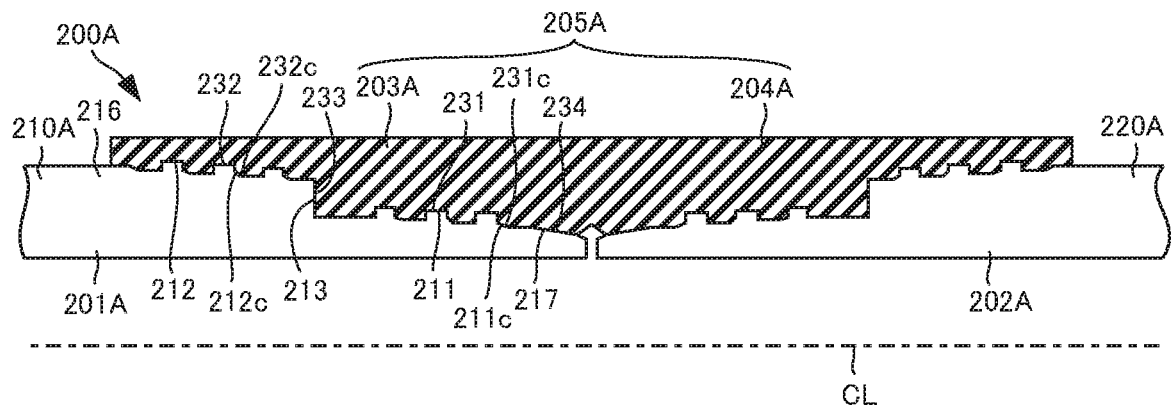
FIG. 16 is a longitudinal cross-sectional view of a threaded connection according to a first variation of Embodiment 3.

FIG. 16 is a longitudinal cross-sectional view of a threaded connection according to a first variation of Embodiment 3. FIG. 16 shows a portion of the longitudinal cross-sectional view of the connection of a pair of pipes that is located higher than the pipe axis CL; in reality, a mirror image of the longitudinal cross-sectional view shown in FIG. 16 with respect to the pipe axis CL is present below the pipe axis CL.

Referring to FIG. 16, the threaded connection 200A according to the first variation of Embodiment 3 includes pins 201A and 202A and boxes 203A and 204A.

A pair of pipes 210A and 220A are to be connected, and the pin 201A is provided on a pipe end of one pipe 210A.

The pin 202A is provided on a pipe end of the other pipe 220A.

The box 203A is provided on one end of a coupling 205A that connects the pipes 210A and 220A, while the box 204A is provided on the other end of the coupling 205A.

The pin 201A has a construction obtained by adding a sealing surface 217 (i.e. pin sealing surface) to the pin 201. The sealing surface 217 is located closer to the tip of the pin 201A than the male thread 211 is. The sealing surface 217 is tapered. More exactly, the sealing surface 217 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The pin 202A has the same construction as the pin 201A.

The box 203A has a construction obtained by adding to the box 203 a sealing surface 234 (i.e. box sealing surface) to correspond to the sealing surface 217 of the pin 201A. The sealing surface 234 is located inward of the female thread 231 with respect to the coupling 205A. The sealing surface 234 is tapered. More exactly, the sealing surface 234 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The box 204A has the same construction as the box 203A.

As the pin 201A is screwed in, the sealing surfaces 217 and 234 also contact each other and, after locked flank is reached, adhere to each other to form a seal via metal-to-metal contact.

The threaded connection 200A is also constructed such that, when, in the varying-thread-width portion 11A of the pin 201A, stab flanks 111 and load flanks 112 of the male threads 211 and 212 contact stab flanks 311 and load flanks 312, respectively, of the female threads 231 and 232 of the box 203A, the intermediate shoulder 213 of the pin 201A is not in contact with the intermediate shoulder 233 of the box 203A, and, with a further rotation in the make-up direction, the intermediate shoulder 213 of the pin 201A is capable of contacting the intermediate shoulder 233 of the box 203 before the threads (i.e. male threads 211 and 212 and female threads 231 and 232) yield.

In the varying-thread-width portion 11A of the pin 202A, when stab flanks 111 and load flanks 112 of the male threads 211 and 212 contact stab flanks 311 and load flanks 312, respectively, of the female threads 231 and 232 of the box 204A, the intermediate shoulder 213 of the pin 202A is not in contact with the intermediate shoulder 233 of the box 204A, and, with a further rotation in the make-up direction, the intermediate shoulder 213 of the pin 202A is capable of contacting the intermediate shoulder 233 of the box 204A before the threads (i.e. male threads 211 and 212 and female threads 231 and 232) yield.

Thus, the threaded connection 200A also provides the torque chart shown in FIG. 4.

The threaded connection 200A provides a higher sealing performance than the threaded connection 200 since it includes a set of seals. Further, in view of this, the sealing performance in the threads may be lower than that of the threaded connection 200.

On the other hand, as tightening proceeds, the seals of the threaded connection 200A may yield before the threads or intermediate shoulders yield. Thus, the range of torque that leads to the threads providing stable performance may be potentially wider in the threaded connection 200.

Figure 17:
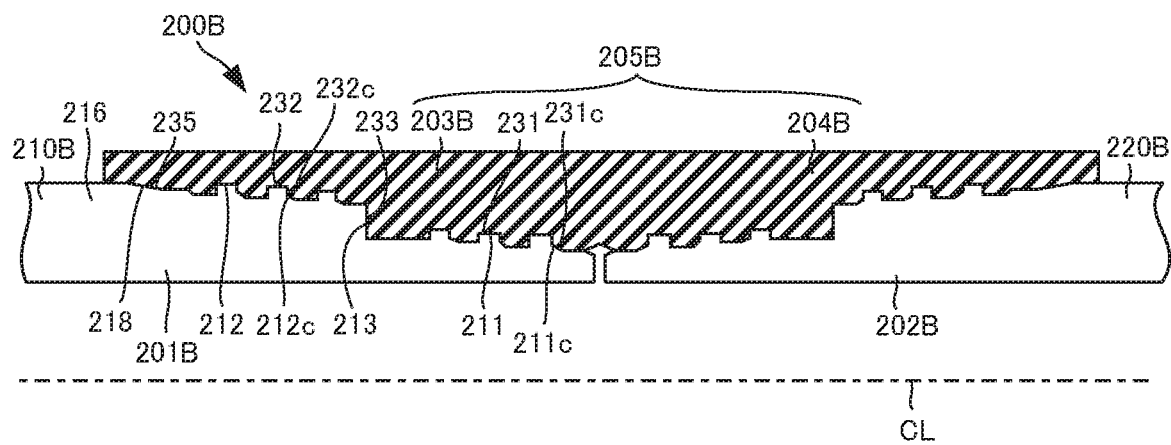
FIG. 17 is a longitudinal cross-sectional view of a threaded connection according to a second variation of Embodiment 3.

FIG. 17 is a longitudinal cross-sectional view of a threaded connection according to a second variation of Embodiment 3. FIG. 17 shows a portion of the longitudinal cross-sectional view of the connection of a pair of pipes that is located higher than the pipe axis CL; in reality, a mirror image of the longitudinal cross-sectional view shown in FIG. 17 with respect to the pipe axis CL is present below the pipe axis CL.

Referring to FIG. 17, the threaded connection 200B according to the second variation of Embodiment 3 includes pins 201B and 202B and boxes 203B and 204B.

A pair of pipes 210B and 220B are to be connected, and the pin 201B is provided on a pipe end of one pipe 210B.

The box 203B is provided on one end of a coupling 205B that connects the pipes 210B and 220B.

The pin 201B has a construction obtained by adding a sealing surface 218 (i.e. pin sealing surface) to the pin 201. The sealing surface 218 is located between the male thread 212 and the base 216 of the pin 201B. The sealing surface 218 is tapered. More exactly, the sealing surface 218 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The pin 202B has the same construction as the pin 201B.

The box 203B has a construction obtained by adding to the box 203 a sealing surface 235 (i.e. box sealing surface) to correspond to the sealing surface 218 of the pin 201B. The sealing surface 235 is located closer to one end of the coupling 205B than the female thread 232 is. The sealing surface 235 is tapered. More exactly, the sealing surface 235 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The box 204B has the same construction as the box 203b.

As the pin 201B is screwed in, the sealing surfaces 218 and 235 also contact each other and, after locked flank is reached, adhere to each other to form a seal via metal-to-metal contact.

The threaded connection 200B is also constructed such that, when, in the varying-thread-width portion 11A of the pin 201B, stab flanks 111 and load flanks 112 of the male threads 211 and 212 contact stab flanks 311 and load flanks 312, respectively, of the female threads 231 and 232 of the box 203B, the intermediate shoulder 213 of the pin 201B is not in contact with the intermediate shoulder 233 of the box 203B, and, with a further rotation in the make-up direction, the intermediate shoulder 213 of the pin 201B is capable of contacting the intermediate shoulder 233 of the box 203B before the threads (i.e. male threads 211 and 212 and female threads 231 and 232) yield.

In the varying-thread-width portion 11A of the pin 202B, when stab flanks 111 and load flanks 112 of the male threads 211 and 212 contact stab flanks 311 and load flanks 312, respectively, of the female threads 231 and 232 of the box 204B, the intermediate shoulder 213 of the pin 202B is not in contact with the intermediate shoulder 233 of the box 204A, and, with a further rotation in the make-up direction, the intermediate shoulder 213 of the pin 202B is capable of contacting the intermediate shoulder 233 of the box 204B before the threads (i.e. male threads 211 and 212 and female threads 231 and 232) yield.

Thus, the threaded connection 200B also provides the torque chart shown in FIG. 4.

The threaded connection 200B provides a higher sealing performance than the threaded connection 200 since it includes a set of seals. Further, in view of this, the sealing performance in the threads may be lower than that of the threaded connection 200.

On the other hand, as tightening proceeds, the seals of the threaded connection 200B may yield before the threads or intermediate shoulders yield. Thus, the range of torque that leads to the threads providing stable performance may be potentially wider in the threaded connection 200.

Figure 18:
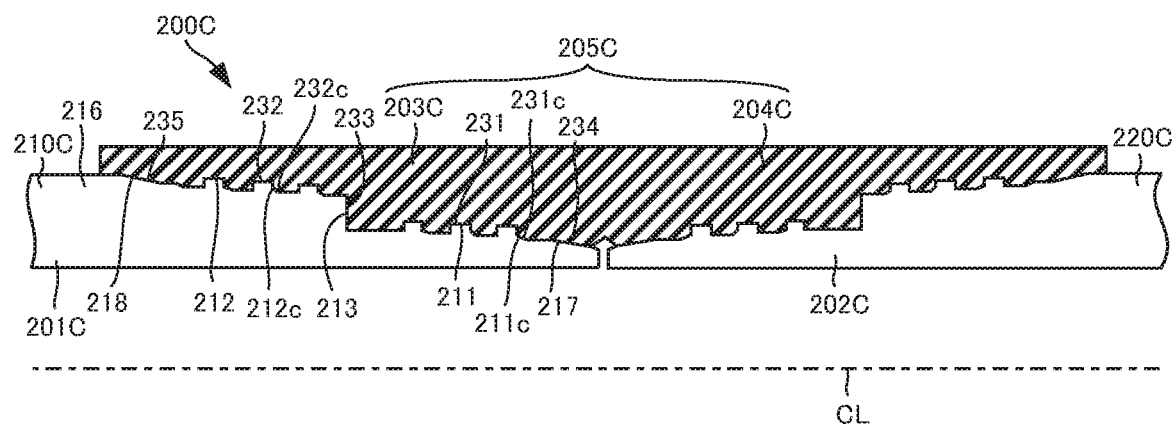
FIG. 18 is a longitudinal cross-sectional view of a threaded connection according to a third variation of Embodiment 3.

FIG. 18 is a longitudinal cross-sectional view of a threaded connection according to a third variation of Embodiment 3. FIG. 18 shows a portion of the longitudinal cross-sectional view of the connection of a pair of pipes that is located higher than the pipe axis CL; in reality, a mirror image of the longitudinal cross-sectional view shown in FIG. 18 with respect to the pipe axis CL is present below the pipe axis CL.

Referring to FIG. 18, the threaded connection 200C according to the third variation of Embodiment 3 includes pins 201C and 202C and boxes 203C and 204C.

A pair of pipes 210C and 220C are to be connected, and the pin 201C is provided on a pipe end of one pipe 210C.

The box 203C is provided on one end of a coupling 205C that connects the pipes 210C and 220C.

The pin 201C has a construction obtained by adding the sealing surfaces 217 and 218 discussed above (i.e. pin sealing surfaces) to the pin 201. The pin 202C has the same construction as the pin 201C.

The box 203 has a construction obtained by adding to the box 203 the sealing surfaces 234 and 235 discussed above (i.e. box sealing surfaces). The box 204C has the same construction as the box 203C.

As the pin 201C is screwed in, the sealing surfaces 217 and 234 contact each other and, after locked flank is reached, adhere to each other to form a seal via metal-to-metal contact. As the pin 201C is screwed in, the sealing surfaces 218 and 235 also contact each other and, after locked flank is reached, adhere to each other to form a seal via metal-to-metal contact.

The threaded connection 200C is also constructed such that, when, in the varying-thread-width portion 11A of the pin 201C, stab flanks 111 and load flanks 112 of the male threads 211 and 212 contact stab flanks 311 and load flanks 312, respectively, of the female threads 231 and 232 of the box 203C, the intermediate shoulder 213 of the pin 201C is not in contact with the intermediate shoulder 233 of the box 203C, and, with a further rotation in the make-up direction, the intermediate shoulder 213 of the pin 201C is capable of contacting the intermediate shoulder 233 of the box 203C before the threads (i.e. male threads 211 and 212 and female threads 231 and 232) yield.

In the varying-thread-width portion 11A of the pin 202C, when stab flanks 111 and load flanks 112 of the male threads 211 and 212 contact stab flanks 311 and load flanks 312, respectively, of the female threads 231 and 232 of the box 204C, the intermediate shoulder 213 of the pin 202C is not in contact with the intermediate shoulder 233 of the box 204C, and, with a further rotation in the make-up direction, the intermediate shoulder 213 of the pin 202C is capable of contacting the intermediate shoulder 233 of the box 204C before the threads (i.e. male threads 211 and 212 and female threads 231 and 232) yield.

Thus, the threaded connection 200C also provides the torque chart shown in FIG. 4.

The threaded connection 200C provides a higher sealing performance than the threaded connection 200 since it includes two sets of seals. In view of this, the sealing performance in the threads may be lower than that of the threaded connection 200.

On the other hand, as tightening proceeds, the seals of the threaded connection 200C may yield before the threads or intermediate shoulders yield. Thus, the range of torque that leads to the threads providing stable performance may be potentially wider in the threaded connection 200.

In a threaded connection according to Embodiment 3, each of the pins and boxes may have three or more thread stages. In such implementations, each of the pins and boxes has two or more intermediate shoulders. When a thread interference torque is produced, that is, when stab flanks and load flanks of the male threads of the pin are in contact with stab flanks and load flanks, respectively, of the female threads of the box, none of the two or more intermediate shoulders of the pin is in contact with any of the two or more intermediate shoulders of the box; when a shoulder interference torque is produced, at least one of the two or more intermediate shoulders of the pin contacts at least one of the two or more intermediate shoulders of the box before the threads yield.

Further, a threaded connection according to Embodiment 3 may be constructed such that each of the pins and boxes has three or more thread stages and, in addition, modified in the same manner as the threaded connection 200 discussed above to provide one of the threaded connections 200A, 200B and 200C.

[Embodiment 4]

Figure 19:
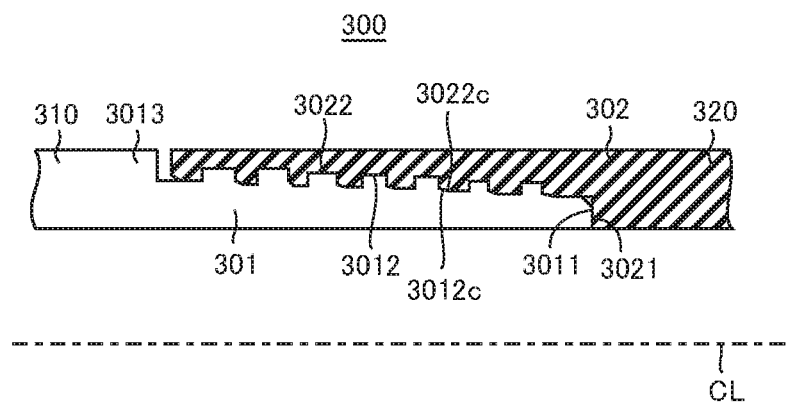
FIG. 19 is a longitudinal cross-sectional view of a threaded connection according to Embodiment 4.

FIG. 19 is a longitudinal cross-sectional view of a threaded connection according to Embodiment 4. FIG. 19 shows a portion of the longitudinal cross-sectional view of the connection of a pair of pipes that is located higher than the pipe axis CL; in reality, a mirror image of the longitudinal cross-sectional view shown in FIG. 19 with respect to the pipe axis CL is present below the pipe axis CL.

Referring to FIG. 19, the threaded connection 300 according to Embodiment 4 includes a pin 301 and a box 302.

The threaded connection 300 is an integral-type threaded connection.

A pair of pipes 310 and 320 are to be connected, and the pin 301 is provided on a pipe end of one pipe 310. The box 302 is provided on a pipe end of the other pipe 320.

The pin 301 includes a shoulder 3011 and a male thread 3012, in this order beginning with the tip. The shoulder 3011 is provided on the tip of the pin 301. The male thread 3012 is located between the shoulder 3011 and the base 3013 of the pin 301 and is tapered.

The box 302 includes a shoulder 3021 and a female thread 3022, in this order beginning from the body of the pipe 320. The shoulder 3021 is provided to correspond to the shoulder 3011 of the pin 301. The female thread 3022 is located closer to the tip of the box 302 than the shoulder 3021 is, and is tapered.

The male thread 3012 of the pin 301 and the female thread 3022 of the box 302 are screwed into each other and thus made up.

When a thread interference torque is produced, the shoulder 3011 (i.e. tip) of the pin 301 is not in contact with the shoulder 3021 of the box 302. When a shoulder interference torque is produced, the shoulder 3011 (i.e. tip) of the pin 301 contacts the shoulder 3021 of the box 302 before the threads (i.e. male and female threads 3012 and 3022) yield.

The shoulder 3011 of the pin 301 and the shoulder 3021 of the box 302 are preferably shaped to be perpendicular to the pipe-axis CL direction.

The male thread 3012 has the same construction as the male thread 11 discussed above, while the female thread 3022 has the same construction as the female thread 31 discussed above (see FIG. 2).

Thus, the male and female threads 3012 and 3022 include a varying-thread-width portion 11A and a constant-thread-width portion 11B, and are shaped to be wedge threads.

In the threaded connection 300, preferably, the male thread 3012 includes chamfered surfaces 3012c and the female thread 3022 includes chamfered surfaces 3022c. The chamfered surfaces 3012c are the same as the chamfered surfaces 11c discussed above, and the chamfered surfaces 3022c are the same as the chamfered surfaces 31c discussed above. Providing chamfered surfaces facilitates insertion of the pin and improves the sealability in the threads.

Figure 20A:
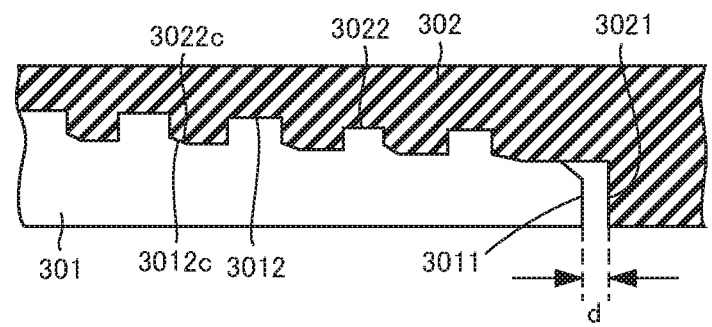
FIG. 20A shows a longitudinal cross-sectional view of the threaded connection shown in FIG. 19, with a thread interference torque and with the shoulders being not in contact with each other.
Figure 20B:
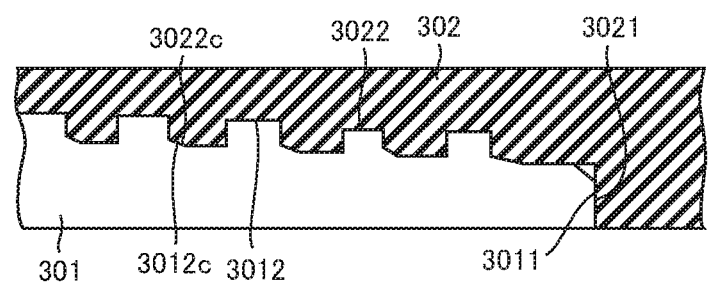
FIG. 20B shows a longitudinal cross-sectional view of the threaded connection shown in FIG. 19, with a thread interference torque and with the shoulders being in contact with each other.

FIGS. 20A and 20B show longitudinal cross-sectional views of the threaded connection 300 shown in FIG. 19, one with a thread interference torque and the other with a shoulder interference torque.

Referring to FIG. 20A, when a thread interference torque is produced, that is, when, in the varying-thread-width portion 11A of the pin 301, stab flanks 111 and load flanks 212 of the male thread 2012 are in contact with stab flanks 311 and load flanks 312, respectively, of the female thread 3022 of the box 302, the shoulder 3011 of the pin 301 is not in contact with the shoulder 3021 of the box 302. The distance between the shoulder 3011 of the pin 301 and the shoulder 3021 of the box 302 is d discussed above.

On the other hand, referring to FIG. 20B, when a shoulder interference torque is produced, the shoulder 3011 of the pin 301 contacts the shoulder 3021 of the box 302 before the threads (i.e. male and female threads 3012 and 3022) yield.

Thus, the threaded connection 300 is constructed such that, when stab flanks 111 and load flanks 112 of the male thread 3012 of the pin 301 contact stab flanks 311 and load flanks 312, respectively, of the female thread 3022 of the box 302, the shoulder 3011 of the pin 301 is not in contact with the shoulder 3021 of the box 302, and, with a further rotation in the make-up direction, the shoulder 3011 of the pin 301 is capable of contacting the shoulder 3021 of the box 302 before the threads (i.e. male and female threads 3012 and 3022) yield.

Thus, the integral-type threaded connection 300 also provides the torque chart shown in FIG. 4.

Figure 21:
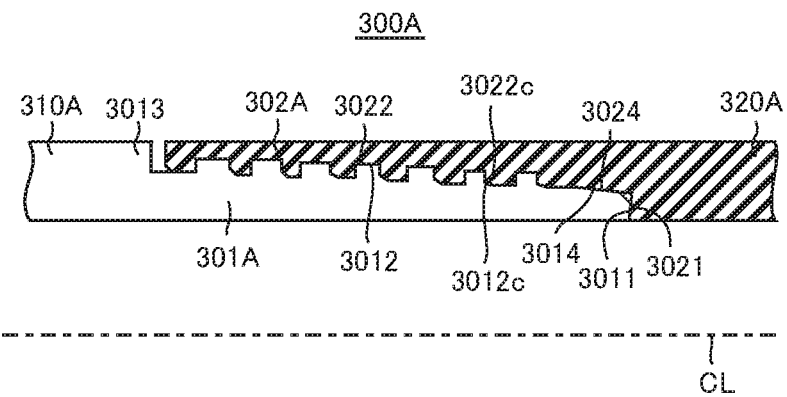
FIG. 21 is a longitudinal cross-sectional view of a threaded connection according to a first variation of Embodiment 4.

FIG. 21 is a longitudinal cross-sectional view of a threaded connection according to a first variation of Embodiment 4. FIG. 21 shows a portion of the longitudinal cross-sectional view of the connection of a pair of pipes that is located higher than the pipe axis CL; in reality, a mirror image of the longitudinal cross-sectional view shown in FIG. 21 with respect to the pipe axis CL is present below the pipe axis CL.

Referring to FIG. 21, the threaded connection 300A according to the first variation of Embodiment 4 includes a pin 301A and a box 302A.

A pair of pipes 310A and 320A are to be connected, and the pin 301A is provided on a pipe end of one pipe 310A.

The box 302A is provided on a pipe end of the other pipe 320A.

The pin 301A has a construction obtained by adding a sealing surface 3014 (i.e. pin sealing surface) to the pin 301. The sealing surface 3014 is located between the shoulder 3011 and male thread 3012. The sealing surface 3014 is tapered. More exactly, the sealing surface 3014 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The box 302A has a construction obtained by adding to the box 302 a sealing surface 3024 (i.e. box sealing surface) to correspond to the sealing surface 3014 of the pin 301A. The sealing surface 3024 is located between the female thread 3022 and shoulder 3021. The sealing surface 3024 is tapered. More exactly, the sealing surface 3024 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

As the pin 301A is screwed in, the sealing surfaces 3014 and 3024 also contact each other and, after locked flank is reached, adhere to each other to form a seal via metal-to-metal contact.

Each shoulder preferably forms a slightly negative angle (for example, $-5°$ to $-20°$). In implementations where a sealing surface is present near the shoulder, the sealability of the sealing surfaces improves if each shoulder forms a negative angle.

The threaded connection 300A is also constructed such that, when, in the varying-thread-width portion 11A of the pin 301A, stab flanks 111 and load flanks 112 of the male thread 3012 contact stab flanks 311 and load flanks 312, respectively, of the female thread 3022 of the box 302A, the shoulder 3011 of the pin 301A is not in contact with the shoulder 3021 of the box 302A, and, with a further rotation in the make-up direction, the shoulder 3011 of the pin 301A is capable of contacting the shoulder 3021 of the box 302A before the threads (i.e. male and female threads 3012 and 3022) yield.

Thus, the threaded connection 300A also provides the torque chart shown in FIG. 4.

The threaded connection 300A provides a higher sealing performance than the threaded connection 300 since it includes a seal. Further, in view of this, the sealing performance in the threads may be lower than that of the threaded connection 300.

On the other hand, as tightening proceeds, the seal of the threaded connection 300A may yield before the threads or shoulders yield. Thus, the range of torque that leads to the threads providing stable performance may be potentially wider in the threaded connection 300.

Figure 22:
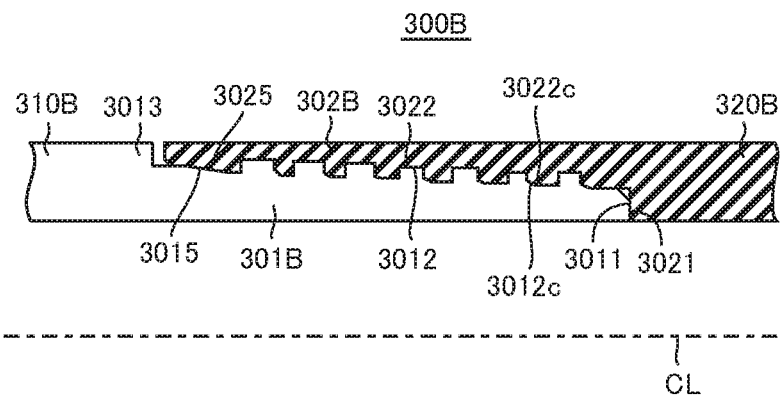
FIG. 22 is a longitudinal cross-sectional view of a threaded connection according to a second variation of Embodiment 4.

FIG. 22 is a longitudinal cross-sectional view of a threaded connection according to a second variation of Embodiment 4. FIG. 22 shows a portion of the longitudinal cross-sectional view of the connection of a pair of pipes that is located higher than the pipe axis CL; in reality, a mirror image of the longitudinal cross-sectional view shown in FIG. 22 with respect to the pipe axis CL is present below the pipe axis CL.

Referring to FIG. 22, the threaded connection 300B according to a second variation of Embodiment 4 includes a pin 301B and a box 302B.

A pair of pipes 310B and 320B are to be connected, and the pin 301B is provided on a pipe end of one pipe 310B.

The box 302B is provided on a pipe end of the other pipe 320B.

The pin 301B has a construction obtained by adding a sealing surface 3015 (i.e. pin sealing surface) to the pin 301. The sealing surface 3015 is located between the male thread 3012 and the base 3013. The sealing surface 3015 is tapered. More exactly, the sealing surface 3015 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The box 302B has a construction obtained by adding to the box 302 a sealing surface 3025 (i.e. box sealing surface) to correspond to the sealing surface 3015 of the pin 301B. The sealing surface 3025 is located closer to the tip of the box 302B than the female thread 3022 is. The sealing surface 3025 is tapered. More exactly, the sealing surface 3025 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

As the pin 301B is screwed in, the sealing surfaces 3015 and 3025 contact each other and, after locked flank is reached, adhere to each other to form a seal via metal-to-metal contact.

The threaded connection 300B is also constructed such that, when, in the varying-thread-width portion 11A of the pin 301B, stab flanks 111 and load flanks 112 of the male thread 3012 contact stab flanks 311 and load flanks 312, respectively, of the female thread 3022 of the box 302B, the shoulder 3011 of the pin 301B is not in contact with the shoulder 3021 of the box 302B and, with a further rotation in the make-up direction, the shoulder 3011 of the pin 301B is capable of contacting the shoulder 3021 of the box 302B before the threads (i.e. male and female threads 3012 and 3022) yield.

Thus, the threaded connection 300B also provides the torque chart shown in FIG. 4.

The threaded connection 300B provides a higher sealing performance than the threaded connection 300 since it includes a seal. Further, in view of this, the sealing performance in the threads may be lower than that of the threaded connection 300.

On the other hand, as tightening proceeds, the seal of the threaded connection 300B may yield before the threads or shoulders yield. Thus, the range of torque that leads to the threads providing stable performance may be potentially wider in the threaded connection 300.

Figure 23:
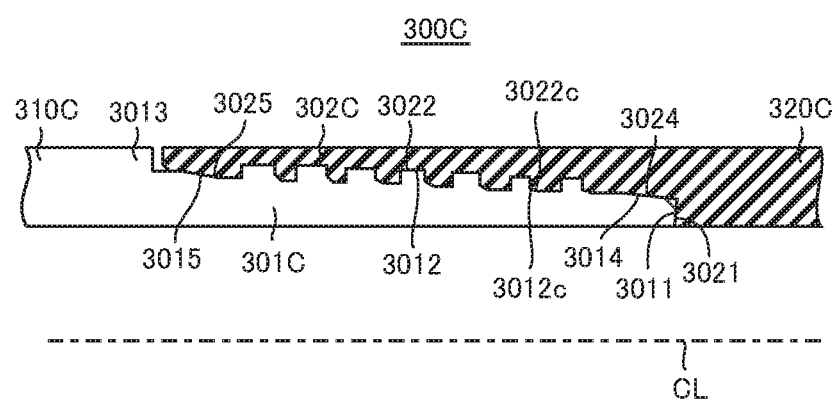
FIG. 23 is a longitudinal cross-sectional view of a threaded connection according to a third variation of Embodiment 4.

FIG. 23 is a longitudinal cross-sectional view of a threaded connection according to a third variation of Embodiment 4. FIG. 23 shows a portion of the longitudinal cross-sectional view of the connection of a pair of pipes that is located higher than the pipe axis CL; in reality, a mirror image of the longitudinal cross-sectional view shown in FIG. 23 with respect to the pipe axis CL is present below the pipe axis CL.

Referring to FIG. 23, the threaded connection 300C according to the third variation of Embodiment 4 includes a pin 301C and a box 302C.

A pair of pipes 310C and 320C are to be connected, and the pin 301C is provided on a pipe end of one pipe 310C.

The box 302C is provided on a pipe end of the other pipe 320C.

The pin 301C has a construction obtained by adding the sealing surfaces 3014 and 3015 discussed above (i.e. pin sealing surfaces) to the pin 301.

The box 302C has a construction obtained by adding to the box 302 the sealing surfaces 3024 and 3025 discussed above (i.e. box sealing surfaces).

As the pin 301C is screwed in, the sealing surfaces 3014 and 3024 contact each other and, after locked flank is reached, adhere to each other to form a seal via metal-to-metal contact. As the pin 301C is screwed in, the sealing surfaces 3015 and 3025 also contact each other and, after locked flank is reached, adhere to each other to form a seal via metal-to-metal contact.

Each shoulder preferably forms a slightly negative angle (for example, −5° to −20°). In implementations where a sealing surface is present near the shoulder, the sealability of the sealing surfaces improves if each shoulder forms a negative angle.

The threaded connection 300C is also constructed such that, when, in the varying-thread-width portion 11A of the pin 301C, stab flanks 111 and load flanks 112 of the male thread 3012 contact stab flanks 311 and load flanks 312, respectively, of the female thread 3022 of the box 302C, the shoulder 3011 of the pin 301C is not in contact with the shoulder 3021 of the box 302C, and, with a further rotation in the make-up direction, the shoulder 3011 of the pin 201C is capable of contacting the shoulder 3021 of the box 302C before the threads (i.e. male and female threads 3012 and 3022) yield.

Thus, the threaded connection 300C also provides the torque chart shown in FIG. 4.

The threaded connection 300C provides a higher sealing performance than the threaded connection 300 since it includes two seals. In view of this, the sealing performance in the threads may be lower than that of the threaded connection 300.

On the other hand, as tightening proceeds, the seals of the threaded connection 300C may yield before the threads or shoulders yield. Thus, the range of torque that leads to the threads providing stable performance may be potentially wider in the threaded connection 300.

[Embodiment 5]

Figure 24:
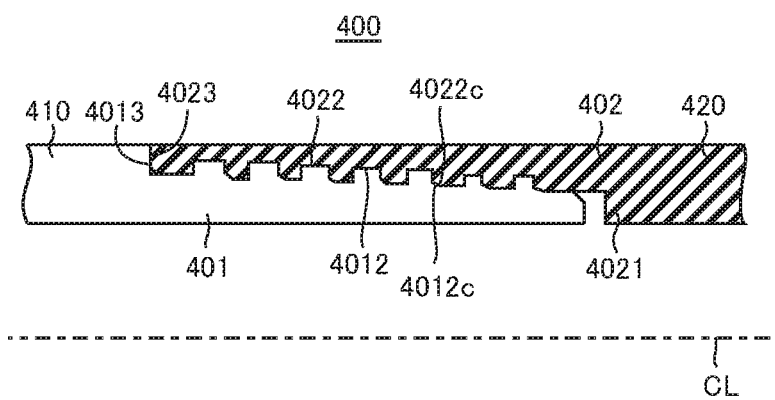
FIG. 24 is a longitudinal cross-sectional view of a threaded connection according to Embodiment 5.

FIG. 24 is a longitudinal cross-sectional view of a threaded connection according to Embodiment 5. FIG. 24 shows a portion of the longitudinal cross-sectional view of the connection of a pair of pipes that is located higher than the pipe axis CL; in reality, a mirror image of the longitudinal cross-sectional view shown in FIG. 24 with respect to the pipe axis CL is present below the pipe axis CL.

Referring to FIG. 24, the threaded connection 400 according to Embodiment 5 includes a pin 401 and a box 402.

The threaded connection 400 is an integral-type threaded connection.

A pair of pipes 410 and 420 are to be connected, and the pin 401 is provided on a pipe end of one pipe 410. The box 402 is provided on a pipe end of the other pipe 420.

The pin 401 includes a male thread 4012 and a shoulder 4013, in this order beginning with the tip. The male thread 4012 is located between the shoulder 4013 and the tip of the pin 401 and is tapered. The shoulder is located closer to the body of the pipe 410 than the male thread 4012 is.

The box 402 includes a female thread 4022 and a shoulder 4023, in this order beginning from the body of the pipe 420. The female thread 4022 is located between the base 4021 and shoulder 4023 of the box 402, and is tapered. The shoulder 4023 is located on the tip of the box 402 to correspond to the shoulder 4013 of the pin 401.

The male thread 4012 of the pin 401 and the female thread 4022 of the box 402 are screwed into each other and thus made up.

When a thread interference torque is produced, the shoulder 4013 of the pin 401 is not in contact with the shoulder 4023 of the box 402. When a shoulder interference torque is produced, the shoulder 4013 of the pin 401 contacts the shoulder 4023 of the box 402 before the threads (i.e. male and female threads 4012 and 4022) yield.

The shoulder 4013 of the pin 401 and the shoulder 4023 of the box 402 are preferably shaped to be perpendicular to the pipe-axis CL direction.

The male thread 4012 has the same construction as the male thread 11 discussed above, while the female thread 4022 has the same construction as the female thread 31 discussed above (see FIG. 2).

Thus, the male and female threads 4012 and 4022 include a varying-thread-width portion 11A and a constant-thread-width portion 11B, and are shaped to be wedge threads.

In the threaded connection 400, preferably, the male thread 4012 includes chamfered surfaces 4012c and the female thread 4022 includes chamfered surfaces 4022c. The chamfered surfaces 4012c are the same as the chamfered surfaces 11c discussed above, and the chamfered surfaces 4022c are the same as the chamfered surfaces 31c discussed above. Providing chamfered surfaces facilitates insertion of the pin and improves the sealability in the threads.

Figure 25A:
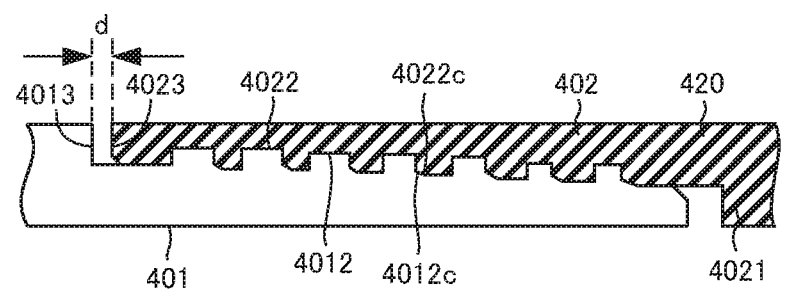
FIG. 25A shows a longitudinal cross-sectional view of the threaded connection shown in FIG. 24, with a thread interference torque and with the shoulders being not in contact with each other.
Figure 25B:
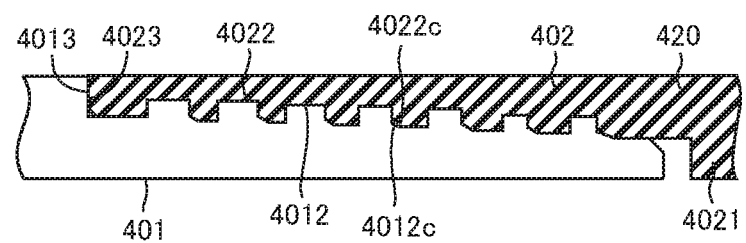
FIG. 25B shows a longitudinal cross-sectional view of the threaded connection shown in FIG. 24, with a thread interference torque and with the shoulders being in contact with each other.

FIGS. 25A and 25B show longitudinal cross-sectional views of the threaded connection 400 shown in FIG. 24, one with a thread interference torque and the other with a shoulder interference torque.

Referring to FIG. 25A, when a thread interference torque is produced, that is, when, in the varying-thread-width portion 11A of the pin 401, stab flanks 111 and load flanks 212 of the male thread 4012 are in contact with stab flanks 311 and load flanks 312 of the female thread 4022 of the box 402, the shoulder 4013 of the pin 301 is not in contact with the shoulder 4023 of the box 402. The distance between the shoulder 4013 of the pin 401 and the shoulder 4023 of the box 402 is d discussed above.

On the other hand, referring to FIG. 25B, when a shoulder interference torque is produced, the shoulder 4013 of the pin 401 contacts the shoulder 4023 of the box 402 before the threads (i.e. male and female threads 4012 and 4022) yield.

Thus, the threaded connection 400 is constructed such that, when stab flanks 111 and load flanks 112 of the male thread 4012 of the pin 401 contact stab flanks 311 and load flanks 312, respectively, of the female thread 4022 of the box 402, the shoulder 4013 of the pin 401 is not in contact with the shoulder 4023 of the box 402, and, with a further rotation in the make-up direction, the shoulder 4013 of the pin 401 is capable of contacting the shoulder 4023 of the box 402 before the threads (i.e. male and female threads 4012 and 4022) yield.

Thus, the integral-type threaded connection 400 also provides the torque chart shown in FIG. 4.

Figure 26:
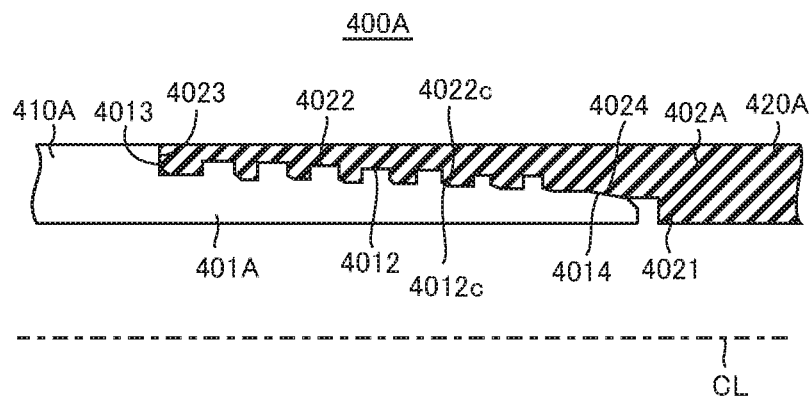
FIG. 26 is a longitudinal cross-sectional view of a threaded connection according to a first variation of Embodiment 5.

FIG. 26 is a longitudinal cross-sectional view of a threaded connection according to a first variation of Embodiment 5. FIG. 26 shows a portion of the longitudinal cross-sectional view of the connection of a pair of pipes that is located higher than the pipe axis CL; in reality, a mirror image of the longitudinal cross-sectional view shown in FIG. 26 with respect to the pipe axis CL is present below the pipe axis CL.

Referring to FIG. 26, the threaded connection 400A according to the first variation of Embodiment 5 includes a pin 401A and a box 402A.

A pair of pipes 410A and 420A are to be connected, and the pin 401A is provided on a pipe end of one pipe 410A.

The box 402A is provided on a pipe end of the other pipe 420A.

The pin 401A has a construction obtained by adding a sealing surface 4014 (i.e. pin sealing surface) to the pin 401. The sealing surface 4014 is located between the tip of the pin 401A and the male thread 4012. The sealing surface 4014 is tapered. More exactly, the sealing surface 4014 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The box 402A has a construction obtained by adding to the box 402 a sealing surface 4024 (i.e. box sealing surface) to correspond to the sealing surface 4014 of the pin 401A. The sealing surface 4024 is located between the female thread 4022 and the base 4021 of the box 402A. The sealing surface 4024 is tapered. More exactly, the sealing surface 4024 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

As the pin 401A is screwed in, the sealing surfaces 4014 and 4024 contact each other and, after locked flank is reached, adhere to each other to form a seal via metal-to-metal contact.

The threaded connection 400A is constructed such that, when, in the varying-thread-width portion 11A of the pin 401A, stab flanks 111 and load flanks 112 of the male thread 4012 contact stab flanks 311 and load flanks 312, respectively, of the female thread 4022 of the box 402A, the shoulder 4013 of the pin 401A is not in contact with the shoulder 4023 of the box 402A, and, with a further rotation in the make-up direction, the shoulder 4013 of the pin 401A is capable of contacting the shoulder 4023 of the box 402A before the threads (i.e. male and female threads 4012 and 4022) yield.

Thus, the threaded connection 400A also provides the torque chart shown in FIG. 4.

The threaded connection 400A provides a higher sealing performance than the threaded connection 400 since it includes a seal. Further, in view of this, the sealing performance in the threads may be lower than that of the threaded connection 400.

On the other hand, as tightening proceeds, the seal of the threaded connection 400A may yield before the threads or shoulders yield. Thus, the range of torque that leads to the threads providing stable performance may be potentially wider in the threaded connection 400.

Figure 27:
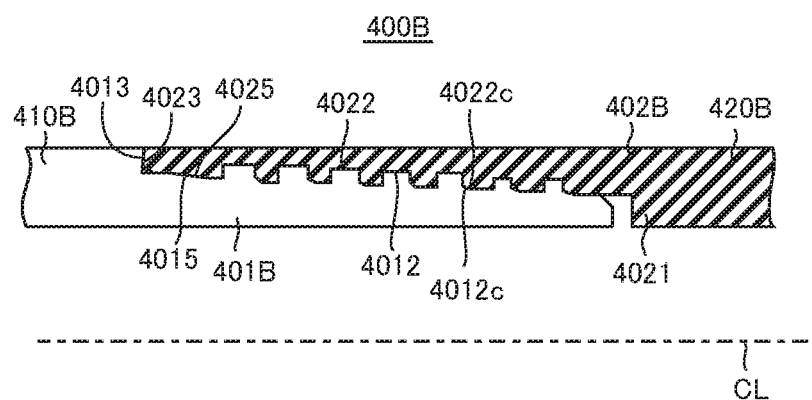
FIG. 27 is a longitudinal cross-sectional view of a threaded connection according to a second variation of Embodiment 5.

FIG. 27 is a longitudinal cross-sectional view of a threaded connection according to a second variation of Embodiment 5. FIG. 27 shows a portion of the longitudinal cross-sectional view of the connection of a pair of pipes that is located higher than the pipe axis CL; in reality, a mirror image of the longitudinal cross-sectional view shown in FIG. 27 with respect to the pipe axis CL is present below the pipe axis CL.

Referring to FIG. 27, the threaded connection 400B according to the second variation of Embodiment 5 includes a pin 401B and a box 402B.

A pair of pipes 410B and 420B are to be connected, and the pin 401B is provided on a pipe end of one pipe 410B.

The box 402B is provided on a pipe end of the other pipe 420B.

The pin 401B has a construction obtained by adding a sealing surface 4015 (i.e. pin sealing surface) to the pin 401. The sealing surface 4015 is located between the male thread 4012 and the shoulder 4013, and is tapered. More exactly, the sealing surface 4015 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The box 402B has a construction obtained by adding to the box 402 a sealing surface 4025 (i.e. box sealing surface) to correspond to the sealing surface 4015 of the pin 401B. The sealing surface 4025 is located between the female thread 4022 and shoulder 4023 and is tapered. More exactly, the sealing surface 4025 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

As the pin 401B is screwed in, the sealing surfaces 4015 and 4025 contact each other and, after locked flank is reached, adhere to each other to form a seal via metal-to-metal contact.

Each shoulder preferably forms a slightly negative angle (for example, −5° to −20°). In implementations where a sealing surface is present near the shoulder, the sealability of the sealing surfaces improves if each shoulder forms a negative angle.

The threaded connection 400B is also constructed such that, when, in the varying-thread-width portion 11A of the pin 401B, stab flanks 111 and load flanks 112 of the male thread 4012 contact stab flanks 311 and load flanks 312, respectively, of the female thread 4022 of the box 402B, the shoulder 4013 of the pin 401B is not in contact with the shoulder 4023 of the box 402B and, with a further rotation in the make-up direction, the shoulder 4013 of the pin 401B is capable of contacting the shoulder 4023 of the box 402B before the threads (i.e. male and female threads 4012 and 4022) yield.

Thus, the threaded connection 400B also provides the torque chart shown in FIG. 4.

The threaded connection 400B provides a higher sealing performance than the threaded connection 400 since it includes a seal. Further, in view of this, the sealing performance in the threads may be lower than that of the threaded connection 400.

On the other hand, as tightening proceeds, the seal of the threaded connection 400B may yield before the threads or shoulders yield. Thus, the range of torque that leads to the threads providing stable performance may be potentially wider in the threaded connection 400.

Figure 28:
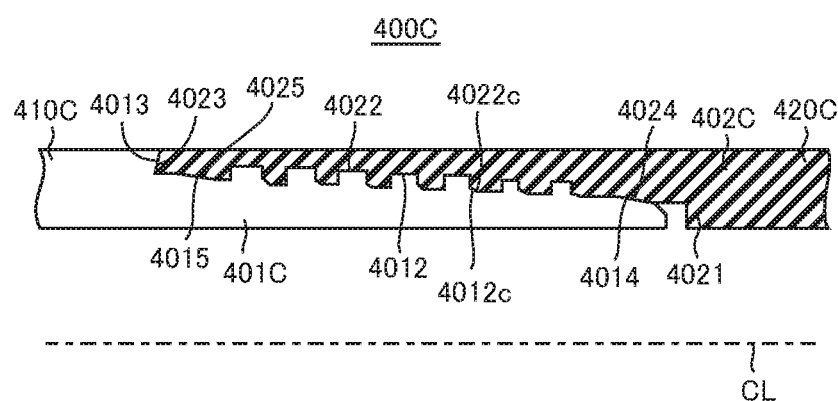
FIG. 28 is a longitudinal cross-sectional view of a threaded connection according to a third variation of Embodiment 5.

FIG. 28 is a longitudinal cross-sectional view of a threaded connection according to a third variation of Embodiment 5. FIG. 28 shows a portion of the longitudinal cross-sectional view of the connection of a pair of pipes that is located higher than the pipe axis CL; in reality, a mirror image of the longitudinal cross-sectional view shown in FIG. 28 with respect to the pipe axis CL is present below the pipe axis CL.

Referring to FIG. 28, the threaded connection 400C according to the third variation of Embodiment 5 includes a pin 401C and a box 402C.

A pair of pipes 410C and 420C are to be connected, and the pin 401C is provided on a pipe end of one pipe 410C.

The box 402C is provided on a pipe end of the other pipe 420C.

The pin 401C has a construction obtained by adding the sealing surfaces 4014 and 4015 discussed above (i.e. pin sealing surfaces) to the pin 401.

The box 402C has a construction obtained by adding to the box 402 the sealing surfaces 4024 and 4025 discussed above (i.e. box sealing surfaces).

As the pin 401C is screwed in, the sealing surfaces 4014 and 4024 contact each other and, after locked flank is reached, adhere to each other to form a seal via metal-to-metal contact. As the pin 401C is screwed in, the sealing surfaces 4015 and 4025 also contact each other and, after locked flank is reached, adhere to each other to form a seal via metal-to-metal contact.

Each shoulder preferably forms a slightly negative angle (for example, −5° to −20°). In implementations where a sealing surface is present near the shoulder, the sealability of the sealing surfaces improves if each shoulder forms a negative angle.

The threaded connection 400C is also constructed such that, when, in the varying-thread-width portion 11A of the pin 401C, stab flanks 111 and load flanks 112 of the male thread 4012 contact stab flanks 311 and load flanks 312, respectively, of the female thread 4022 of the box 402C, the shoulder 4013 of the pin 401C is not in contact with the shoulder 4023 of the box 402C, and, with a further rotation in the make-up direction, the shoulder 4013 of the pin 401C is capable of contacting the shoulder 4023 of the box 402C before the threads (i.e. male and female threads 4012 and 4022) yield.

Thus, the threaded connection 400C also provides the torque chart shown in FIG. 4.

The threaded connection 400C provides a higher sealing performance than the threaded connection 400 since it includes two seals. In view of this, the sealing performance in the threads may be lower than that of the threaded connection 400.

On the other hand, as tightening proceeds, the seals of the threaded connection 400C may yield before the threads or shoulders yield. Thus, the range of torque that leads to the threads providing stable performance may be potentially wider in the threaded connection 400.

[Embodiment 6]

Figure 29:
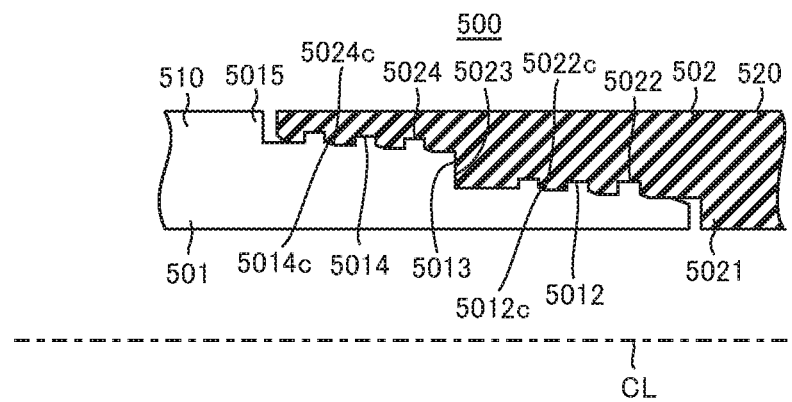
FIG. 29 is a longitudinal cross-sectional view of a threaded connection according to Embodiment 6.

FIG. 29 is a longitudinal cross-sectional view of a threaded connection according to Embodiment 6. FIG. 29 shows a portion of the longitudinal cross-sectional view of the connection of a pair of pipes that is located higher than the pipe axis CL; in reality, a mirror image of the longitudinal cross-sectional view shown in FIG. 29 with respect to the pipe axis CL is present below the pipe axis CL.

Referring to FIG. 29, the threaded connection 500 according to Embodiment 6 includes a pin 501 and a box 502.

The threaded connection 500 is an integral-type threaded connection.

A pair of pipes 510 and 520 are to be connected, and the pin 501 is provided on a pipe end of one pipe 510.

The box 502 is provided on a pipe end of the other pipe 520.

The pin 501 includes a male thread 5012, an intermediate shoulder 5013 and a male thread 5014, in this order beginning with the tip.

The male thread 5012 is located between the tip of the pin 501 and the intermediate shoulder 5013, and is tapered. The intermediate shoulder 5013 is provided between the male threads 5012 and 5014. The male thread 5014 is located between the intermediate shoulder 5013 and the base 5015 of the pin 501, and is tapered.

Thus, the pin 501 has a double-stage thread construction.

The box 502 includes a female thread 5022, an intermediate shoulder 5023 and a female thread 5024, in this order beginning with the body of the pipe 520. The female thread 5022 is located between the base 5021 of the box 502 and the intermediate shoulder 5023 to correspond to the male thread 5012 of the pin 501, and is tapered. The intermediate shoulder 5023 is located between the female threads 5022 and 5024 to correspond to the intermediate shoulder 5013 of the pin 501. The female thread 5024 is located between the intermediate shoulder 5023 and the tip of the box 502 and is tapered.

Thus, the box 502 has a double-stage thread construction corresponding to the thread construction of the pin 501.

The male thread 5012 of the pin 501 and the female thread 5022 of the box 502 are screwed into each other and thus made up.

The male thread 5014 of the pin 501 and the female thread 5024 of the box 502 are screwed into each other and thus made up.

When the male thread 5012 has been screwed into the female thread 5022 and the male thread 5014 has been screwed into the female thread 5024 and a thread interference torque is produced, the intermediate shoulder 5013 of the pin 501 is not in contact with the intermediate shoulder 5023 of the box 502; when a shoulder interference torque is produced, the intermediate shoulder 5013 of the pin 501 contacts the intermediate shoulder 5023 of the box 502 before the threads (i.e. male threads 5012 and 5014 and female threads 5022 and 5024) yield.

The intermediate shoulder 5013 of the pin 501 and the intermediate shoulder 5023 of the box 502 are preferably shaped to be perpendicular to the pipe-axis CL direction.

Regardless of whether a thread interference torque or a shoulder interference torque is produced, the tip of the pin 501 does not contact the base 5021 of the box 502, nor does the base 5015 of the pin 501 contact the tip of the box 502.

Each of the male threads 5012 and 5014 has the same construction as the male thread 11 discussed above, and each of the female threads 5022 and 5024 has the same construction as the female thread 31 discussed above (see FIG. 2).

Thus, each of the male threads 5012 and 5014 and each of the female threads 5022 and 5024 has a varying-thread-width portion 11A and a constant-thread-width portion 11B. Each of the male threads 5012 and 5014 and each of the female threads 5022 and 5024 is shaped to be a wedge thread.

In the threaded connection 500, preferably, the male thread 5012 includes chamfered surfaces 5012c, the male thread 5014 includes chamfered surfaces 5014c, the female thread 5022 includes chamfered surfaces 5022c, and the female thread 5024 includes chamfered surfaces 5024c. The chamfered surfaces 5012c and 5014c are the same as the chamfered surfaces 11c discussed above, and the chamfered surfaces 5022c and 5024c are the same as the chamfered surfaces 31c discussed above.

Providing chamfered surfaces facilitates insertion of the pin and improves the sealability in the threads.

Figure 30A:
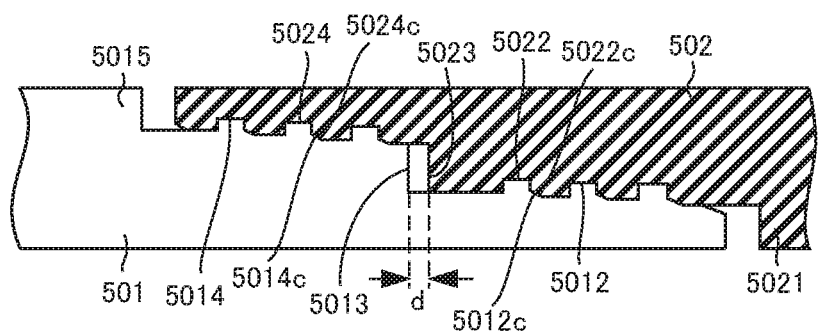
FIG. 30A shows a longitudinal cross-sectional view of the threaded connection shown in FIG. 29, with a thread interference torque and with the shoulders being not in contact with each other.
Figure 30B:
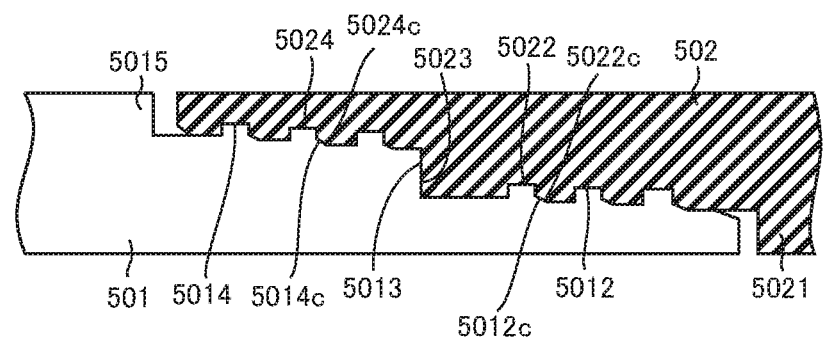
FIG. 30B shows a longitudinal cross-sectional view of the threaded connection shown in FIG. 29, with a thread interference torque and with the shoulders being in contact with each other.

FIGS. 30A and 30B show longitudinal cross-sectional views of the threaded connection 500 shown in FIG. 29, one with a thread interference torque and the other with a shoulder interference torque.

Referring to FIG. 30A, when a thread interference torque is produced, that is, when, in the varying-thread-width portion 11A, stab flanks 111 and load flanks 212 of the male threads 5012 and 5014 are in contact with stab flanks 311 and load flanks 312 of the female threads 5022 and 5024 of the box 502, the intermediate shoulder 5013 of the pin 501 is not in contact with the intermediate shoulder 5023 of the box 502. The distance between the intermediate shoulders 5013 of the pin 501 and the intermediate shoulder 5023 of the box 502 is d discussed above.

On the other hand, referring to FIG. 30B, when a shoulder interference torque is produced, the intermediate shoulder 5013 of the pin 501 contacts the intermediate shoulder 5023 of the box 502 before the threads (i.e. male threads 5012 and 5014 and female threads 5022 and 5024) yield.

Thus, the threaded connection 500 is constructed such that, when stab flanks 111 and load flanks 112 of the male threads 5012 and 5014 of the pin 501 contact stab flanks 311 and load flanks 312, respectively, of the female threads 5022 and 5024 of the box 502, the intermediate shoulder 5013 of the pin 501 is not in contact with the intermediate shoulder 5023 of the box 502, and, with a further rotation in the make-up direction, the intermediate shoulder 5013 of the pin 501 is capable of contacting the intermediate shoulder 5023 of the box 502 before the threads (i.e. male threads 5012 and 5014 and female threads 5022 and 5024) yield.

Thus, the integral-type threaded connection 500 also provides the torque chart shown in FIG. 4.

Figure 31:
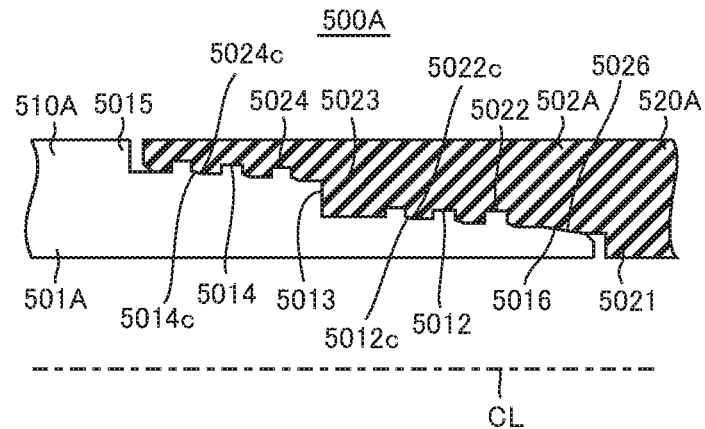
FIG. 31 is a longitudinal cross-sectional view of a threaded connection according to a first variation of Embodiment 6.

FIG. 31 is a longitudinal cross-sectional view of a threaded connection according to a first variation of Embodiment 6. FIG. 31 shows a portion of the longitudinal cross-sectional view of the connection of a pair of pipes that is located higher than the pipe axis CL; in reality, a mirror image of the longitudinal cross-sectional view shown in FIG. 31 with respect to the pipe axis CL is present below the pipe axis CL.

Referring to FIG. 31, the threaded connection 500A according to the first variation of Embodiment 6 includes a pin 501A and a box 502A.

A pair of pipes 510A and 520A are to be connected, and the pin 501A is provided on a pipe end of one pipe 510A.

The box 502A is provided on a pipe end of the other pipe 520A.

The pin 501A has a construction obtained by adding a sealing surface 5016 (i.e. pin sealing surface) to the pin 501. The sealing surface 5016 is located between the tip of the pin 501A and the male thread 5012. The sealing surface 5016 is tapered. More exactly, the sealing surface 5016 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The box 502A has a construction obtained by adding to the box 502 a sealing surface 5026 (i.e. box sealing surface) to correspond to the sealing surface 5016 of the pin 501A. The sealing surface 5026 is located between the base 5021 of the box 502A and the female thread 5022. The sealing surface 5026 is tapered. More exactly, the sealing surface 5026 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

As the pin 501A is screwed in, the sealing surfaces 5016 and 5026 also contact each other and, after locked flank is reached, adhere to each other to form a seal via metal-to-metal contact.

The threaded connection 500A is constructed such that, when, in the varying-thread-width portion 11A of the pin 501A, stab flanks 111 and load flanks 112 of the male threads 5012 and 5014 contact stab flanks 311 and load flanks 312, respectively, of the female threads 5022 and 5024 of the box 502A, the intermediate shoulder 5013 of the pin 501A is not in contact with the intermediate shoulder 5023 of the box 502A, and, with a further rotation in the make-up direction, the intermediate shoulder 5013 of the pin 501A is capable of contacting the intermediate shoulder 5023 of the box 502 before the threads (i.e. male threads 5012 and 5014 and female threads 5022 and 5024) yield.

Thus, the threaded connection 500A also provides the torque chart shown in FIG. 4.

The threaded connection 500A provides a higher sealing performance than the threaded connection 500 since it includes a seal. Further, in view of this, the sealing performance in the threads may be lower than that of the threaded connection 500.

On the other hand, as tightening proceeds, the seal of the threaded connection 500A may yield before the threads or shoulders yield. Thus, the range of torque that leads to the threads providing stable performance may be potentially wider in the threaded connection 500.

Figure 32:
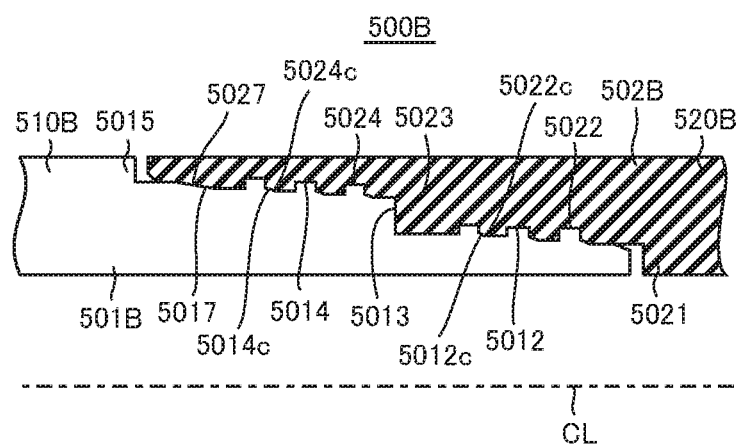
FIG. 32 is a longitudinal cross-sectional view of a threaded connection according to a second variation of Embodiment 6.

FIG. 32 is a longitudinal cross-sectional view of a threaded connection according to a second variation of Embodiment 6. FIG. 32 shows a portion of the longitudinal cross-sectional view of the connection of a pair of pipes that is located higher than the pipe axis CL; in reality, a mirror image of the longitudinal cross-sectional view shown in FIG. 32 with respect to the pipe axis CL is present below the pipe axis CL.

Referring to FIG. 32, the threaded connection 500B according to a second variation of Embodiment 6 includes a pin 501B and a box 502B.

A pair of pipes 510B and 520B are to be connected, and the pin 501B is provided on a pipe end of one pipe 510B.

The box 502B is provided on a pipe end of the other pipe 520B.

The pin 501B has a construction obtained by adding a sealing surface 5017 (i.e. pin sealing surface) to the pin 501. The sealing surface 5017 is located between the male thread 5014 and the base 5015 of the pin 501B. The sealing surface 5017 is tapered. More exactly, the sealing surface 5017 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The box 502B has a construction obtained by adding to the box 502 a sealing surface 5027 (i.e. box sealing surface) to correspond to the sealing surface 5017 of the pin 501B. The sealing surface 5027 is located between the female thread 5024 and the tip of the box 502B. The sealing surface 5027 is tapered. More exactly, the sealing surface 5027 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

As the pin 501B is screwed in, the sealing surfaces 5017 and 5027 contact each other and, after locked flank is reached, adhere to each other to form a seal via metal-to-metal contact.

The threaded connection 500B is also constructed such that, when, in the varying-thread-width portion 11A, stab flanks 111 and load flanks 112 of the male threads 5012 and 5014 of the pin 501B contact stab flanks 311 and load flanks 312, respectively, of the female threads 5022 and 5024 of the box 502B, the intermediate shoulder 5013 of the pin 501B is not in contact with the intermediate shoulder 5023 of the box 502B and, with a further rotation in the make-up direction, the intermediate shoulder 5013 of the pin 501B is capable of contacting the intermediate shoulder 5023 of the box 502B before the threads (i.e. male threads 5012 and 5014 and female threads 5022 and 5024) yield.

Thus, the threaded connection 500B also provides the torque chart shown in FIG. 4.

The threaded connection 500B provides a higher sealing performance than the threaded connection 500 since it includes a seal. Further, in view of this, the sealing performance in the threads may be lower than that of the threaded connection 500.

On the other hand, as tightening proceeds, the seal of the threaded connection 500B may yield before the threads or shoulders yield. Thus, the range of torque that leads to the threads providing stable performance may be potentially wider in the threaded connection 500.

Figure 33:
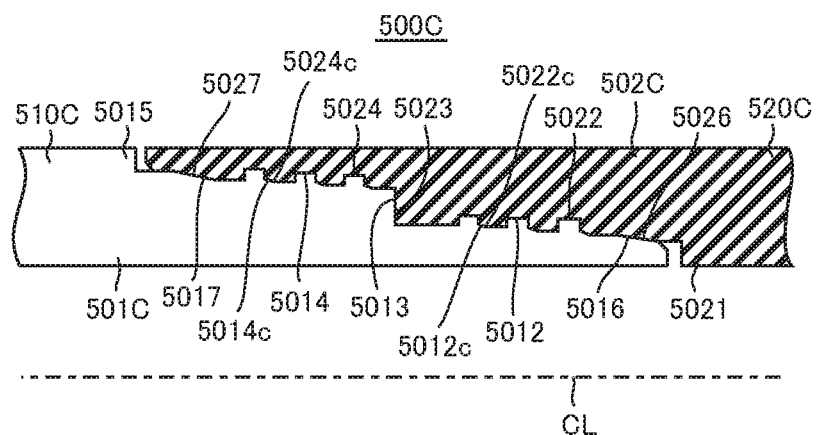
FIG. 33 is a longitudinal cross-sectional view of a threaded connection according to a third variation of Embodiment 6.

FIG. 33 is a longitudinal cross-sectional view of a threaded connection according to a third variation of Embodiment 6. FIG. 33 shows a portion of the longitudinal cross-sectional view of the connection of a pair of pipes that is located higher than the pipe axis CL; in reality, a mirror image of the longitudinal cross-sectional view shown in FIG. 33 with respect to the pipe axis CL is present below the pipe axis CL.

Referring to FIG. 33, the threaded connection 500C according to the third variation of Embodiment 6 includes a pin 501C and a box 502C.

A pair of pipes 510C and 520C are to be connected, and the pin 501C is provided on a pipe end of one pipe 510C.

The box 502C is provided on a pipe end of the other pipe 520C.

The pin 501C has a construction obtained by adding the sealing surfaces 4016 and 5017 discussed above (i.e. pin sealing surfaces) to the pin 501.

The box 502C has a construction obtained by adding to the box 502 the sealing surfaces 5026 and 5027 discussed above (i.e. box sealing surfaces).

As the pin 501C is screwed in, the sealing surfaces 5016 and 5026 contact each other and, after locked flank is reached, adhere to each other to form a seal via metal-tometal contact. As the pin 501C is screwed in, the sealing surfaces 5017 and 5027 contact each other and, after locked flank is reached, adhere to each other to form a seal via metal-to-metal contact.

The threaded connection 500C is also constructed such that, when, in the varying-thread-width portion 11A, stab flanks 111 and load flanks 112 of the male threads 5012 and 5014 of the pin 501C contact stab flanks 311 and load flanks 312, respectively, of the female threads 5022 and 5024 of the box 502C, the intermediate shoulder 5013 of the pin 501C is not in contact with the intermediate shoulder 5023 of the box 502C, and, with a further rotation in the make-up direction, the intermediate shoulder 5013 of the pin 501C is capable of contacting the intermediate shoulder 5023 of the box 502C before the threads (i.e. male threads 5012 and 5014 and female threads 5022 and 5024) yield.

Thus, the threaded connection 500C also provides the torque chart shown in FIG. 4.

The threaded connection 500C provides a higher sealing performance than the threaded connection 500 since it includes two seals. In view of this, the sealing performance in the threads may be lower than that of the threaded connection 500.

On the other hand, as tightening proceeds, the seals of the threaded connection 500C may yield before the threads or shoulders yield. Thus, the range of torque that leads to the threads providing stable performance may be potentially wider in the threaded connection 500.

In a threaded connection according to Embodiment 6, each of the pin and box may have three or more thread stages. In such implementations, each of the pin and box has two or more intermediate shoulders. When a thread interference torque is produced, that is, when stab flanks and load flanks of the male threads of the pin are in contact with stab flanks and load flanks of the female threads of the box, none of the two or more intermediate shoulders of the pin is in contact with any of the two or more intermediate shoulders of the box; when a shoulder interference torque is produced, with a further rotation in the make-up direction, at least one of the two or more intermediate shoulders of the pin contacts at least one of the two or more intermediate shoulders of the box before the threads yield.

Further, a threaded connection according to Embodiment 6 may be constructed such that each of the pin and box has three or more thread stages and, in addition, modified in the same manner as the threaded connection 500 discussed above to provide one of the threaded connections 500A, 500B and 500C.

Figure 34:
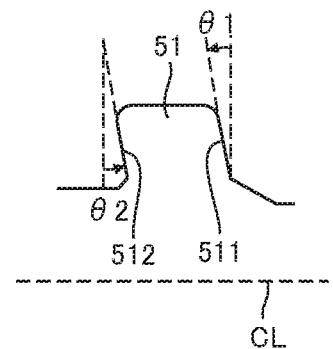
FIG. 34 is a longitudinal cross-sectional view of a trapezoidal thread.

FIG. 34 is a longitudinal cross-sectional view of a trapezoidal thread. Referring to FIG. 34, the male thread 51 is shaped as a trapezoidal thread. The male thread 51 has a stab flank 511 and a load flank 512.

The flank angle θ1 of the stab flank 511 is a positive angle, while the flank angle θ2 of the load flank 512 is a negative angle.

Thus, in the trapezoidal thread, the flank angle θ1 of the stab flank 511 is a positive angle, while the flank angle θ2 of the load flank 512 is a negative angle. The flank angle θ1 is in the range of 5° to 30°, and the flank angle θ2 is in the range of 0° to −15°. The flank angle θ1 may be equal to or different from the flank angle θ2.

Figure 35A:
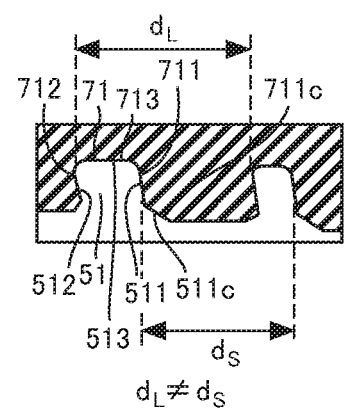
FIG. 35A shows a longitudinal cross-sectional view of a varying-thread-width portion of a threaded connection based on the construction shown in FIG. 1 in which the trapezoidal thread is used.
Figure 35B:
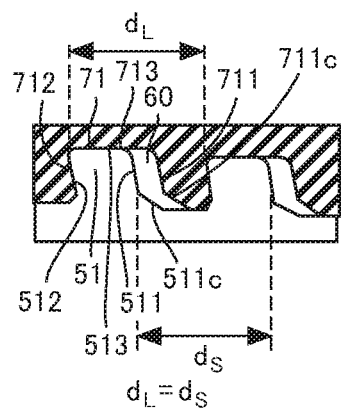
FIG. 35B shows a longitudinal cross-sectional view of a constant-thread-width portion of a threaded connection based on the construction shown in FIG. 1 in which the trapezoidal thread is used.

FIGS. 35A and 35B show longitudinal cross-sectional views of a varying-thread-width portion and a constant-thread-width portion of the threaded connection 10 based on the construction shown in FIG. 1 in which the trapezoidal thread is used. FIG. 35A is a longitudinal cross-sectional view of the varying-thread-width portion 11A, and FIG. 35B is a longitudinal cross-sectional view of the constant-thread-width portion 11B.

In embodiments, male and female threads having the shape of the trapezoidal thread may be used as the threads of the pins 1 and 2 and boxes 3 and 4 of the threaded connection 10.

In the varying-thread-width portion 11A, a stab flank 511 and a load flank 512 of the male thread 51 face a stab flank 711 and a load flank 712, respectively, of the female thread 71, and a thread crest 513 of the male thread 51 faces a thread root 713 of the female thread 71.

During locked flank, the stab flank 511 and load flank 512 of the male thread 51 are in contact with the stab flank 711 and load flank 712, respectively, of the female thread 71, and the thread crest 513 of the male thread 51 is in contact with the thread root 713 of the female thread 71. Thus, in the trapezoidal thread, too, the male thread 51 of the varying-thread-width portion 11A is in contact with the female thread 71 without a gap relative to the female thread 71 during locked flank.

Further, in the varying-thread-width portion 11A, the stab lead ds for the stab flanks 111 is different from the load lead di, for the load flanks 112.

In the constant-thread-width portion 11B, too, a stab flank 511 and a load flank 512 of the male thread 51 face a stab flank 711 and a load flank 712, respectively, of the female thread 71, and a thread crest 513 of the male thread 51 faces a thread root 713 of the female thread 71.

During locked flank, the stab flank 511 of the male thread 51 has a gap 60 relative to the stab flank 711 of the female thread 71, the load flank 512 of the male thread 51 is in contact with the load flank 712 of the female thread 71, and the thread crest 513 of the male thread 51 is in contact with the thread root 713 of the female thread 71. Thus, in the trapezoidal thread, too, the male thread 51 of the constant-thread-width portion 11B has a gap 60 relative to the female thread 71 adjacent to the stab flank 511 during locked flank.

Further, in the constant-thread-width portion 11B, the stab lead ds for the stab flanks 511 is equal to the load lead di, for the load flanks 512.

In the varying-thread-width portion 11A and constant-thread-width portion 11B, each of the thread crest 513 of the male thread 51 and the thread crest 713 of the female thread 71 has the shape of a face corresponding to the periphery of a cylinder having a central axis aligned with the pipe axis CL. Alternatively, each of the thread crest 513 of the male thread 51 and the thread root 713 of the female thread 71 may have the shape of a face corresponding to the periphery of a truncated cone having a central axis aligned with the pipe axis CL.

The male thread 51 preferably includes a chamfered surface 511c. The chamfered surface 511c is an inclined surface connecting a stab flank 511 and a root of the male thread 51. The female thread 71 preferably includes a chamfered surface 711c corresponding to the chamfered surface 511c of the male thread 51.

In the constant-thread-width portion 11A, during locked flank, the chamfered surface 511c of the male thread 51 is in contact with the chamfered surface 711c of the female thread 71 (see (a)). On the other hand, in the constant-thread-width portion 11B, the chamfered surface 511c of the male thread 51 is not in contact with the chamfered surface 711c of the female thread 71 during locked flank.

Providing chamfered surfaces facilitates insertion of the pin and improves the sealability in the threads. The angle of the chamfered surface 511c is suitably in the range of 30° to 60° relative to the root of the male thread 51.

As discussed above, in implementations using male and female threads 51 and 71 shaped to be trapezoidal threads, during locked flank, stab flanks 511 and load flanks 512 of the male thread 51 in the constant-thread-width portion 11A are in contact with stab flanks and load flanks, respectively, of the female thread 71 of the box.

Thus, in implementations where the male and female threads 51 and 71 shaped to be trapezoidal threads are used as the male and female threads 11 and 31 of the threaded connection 10, the threaded connection 10 is constructed such that the shoulder 12 (i.e. tip) of the pin 1 is not in contact with the shoulder 22 (i.e. tip) of the pin 2 when stab flanks 511 and load flanks 512 of the male thread 51 contact stab flanks and load flanks, respectively, of the female thread 71 of the box 3, and, with a further rotation in the make-up direction, the shoulder 12 (i.e. tip) of the pin 1 is capable of contacting the shoulder 22 (i.e. tip) of the pin 2 before the threads (i.e. male and female threads 51 and 71) yield.

Thus, when the male and female threads 51 and 71 shaped to be trapezoidal threads are used as the male and female threads 11 and 31 of the threaded connection 10, the threaded connection 10 also provides the torque chart shown in FIG. 4.

In embodiments, the male and female threads 51 and 71 shaped to be trapezoidal threads may be applied to any one of the threaded connections 10A, 10B, 10C, 100, 100A, 100B, 100C, 200, 200A, 200B, 200C, 300, 300A, 300B, 300C, 400, 400A, 400B, 400C, 500, 500A, 500B and 500C.

In such cases, one of the threaded connections 10A, 10B, 10C, 100, 100A, 100B, 100C, 200, 200A, 200B, 200C, 300, 300A, 300B, 300C, 400, 400A, 400B, 400C, 500, 500A, 500B and 500C provides the torque chart shown in FIG. 4.

Thus, in embodiments, the male and female threads may be wedge threads or trapezoidal threads.

Further, in the threaded connection 10, the above-described male thread 11 may only be composed of the varying-thread-width portion 11A. This is because, even if the constant-thread-width portion 11B is not provided, torque increases as stab flanks 111 and load flanks 112 of the male thread 11 interfere with stab flanks 311 and load flanks 312 of the female thread 31, and, with a further rotation in the make-up direction, further increases as the tip of the pin 1 interferes with the tip of the pin 2 before the threads (i.e. male and female threads 11 and 31) yield, thereby providing a wide range of torque. Thus, the male thread 11 is required to include at least the varying-thread-width portion 11A. For the same reasons, in the threaded connections 10A, 10B, 10C, 100, 100A, 100B, 100C, 200, 200A, 200B, 200C, 300, 300A, 300B, 300C, 400, 400A, 400B, 400C, 500, 500A, 500B and 500C, the male thread 11 is required to include at least the varying-thread-width portion 11A.

Embodiment 1 discussed above describes a coupling-type threaded connection 10 constructed such that, when stab flanks 111 and load flanks 112 of the male thread 11 of the pin 1 contact stab flanks 311 and load flanks 312, respectively, of the female thread 31 of the box 3, the shoulder 12 (i.e. tip) of the pin 1A is not in contact with the shoulder 22 (i.e. tip) of the pin 2 and, with a further rotation in the make-up direction, the shoulder 12 (i.e. tip) of the pin 1 is capable of contacting the shoulder 22 (i.e. tip) of the pin 2 before the threads (i.e. male and female threads 11 and 31) yield.

Embodiment 2 discussed above describes a coupling-type threaded connection 100 constructed such that, when stab flanks 111 and load flanks 112 of the male thread 11 of the pin 1 contact stab flanks 311 and load flanks 312, respectively, of the female thread 31 of the box 3D, the shoulder 12 (i.e. tip) of the pin 1 is not in contact with the shoulder 34 of the box 3D and, with a further rotation in the make-up direction, the shoulder 12 (i.e. tip) of the pin 1 is capable of contacting the shoulder 34 of the box 3D before the threads (i.e. male and female threads 11 and 31) yield.

Embodiment 3 discussed above describes a coupling-type threaded connection 200 constructed such that, when stab flanks 111 and load flanks 112 of the male threads 211 and 212 of the pin 201 contact stab flanks 311 and load flanks 312, respectively, of the female threads 231 and 232 of the box 203, the intermediate shoulder 213 of the pin 201 is not in contact with the intermediate shoulder 233 of the box 203, and, with a further rotation in the make-up direction, the intermediate shoulder 213 of the pin 201 is capable of contacting the intermediate shoulder 233 of the box 203 before the threads (i.e. male threads 211 and 212 and female threads 231 and 232) yield.

Embodiment 4 discussed above describes an integral-type threaded connection 300 constructed such that, when stab flanks 111 and load flanks 112 of the male thread 3012 of the pin 301 contact stab flanks 311 and load flanks 312, respectively, of the female thread 3022 of the box 302, the shoulder 3011 of the pin 301 is not in contact with the shoulder 3021 of the box 302, and, with a further rotation in the make-up direction, the shoulder 3011 of the pin 301 is capable of contacting the shoulder 3021 of the box 302 before the threads (i.e. male and female threads 3012 and 3022) yield.

Embodiment 5 discussed above describes an integral-type threaded connection 400 constructed such that, when stab flanks 111 and load flanks 112 of the male thread 4012 of the pin 401 contact stab flanks 311 and load flanks 312, respectively, of the female thread 4022 of the box 402, the shoulder 4013 of the pin 401 is not in contact with the shoulder 4023 of the box 402, and, with a further rotation in the make-up direction, the shoulder 4013 of the pin 401 is capable of contacting the shoulder 4023 of the box 402 before the threads (i.e. male and female threads 4012 and 4022) yield.

Embodiment 6 discussed above describes an integral-type threaded connection 500 constructed such that, when stab flanks 111 and load flanks 112 of the male threads 5012 and 5014 of the pin 501 contact stab flanks 311 and load flanks 312, respectively, of the female threads 5022 and 5024 of the box 502, the intermediate shoulder 5013 of the pin 501 is not in contact with the intermediate shoulder 5023 of the box 502, and, with a further rotation in the make-up direction, the intermediate shoulder 5013 of the pin 501 is capable of contacting the intermediate shoulder 5023 of the box 502 before the threads (i.e. male threads 5012 and 5014 and female threads 5022 and 5024) yield.

In the varying-thread-width portion 11A, stab flanks 111 and load flanks 112 of the male thread 11, for example, contact stab flanks 311 and load flanks 312, respectively, of the female thread 31, for example, of the box 3, for example.

Accordingly, the threaded connection according to an embodiment is only required to be a threaded connection for connecting pipes and include a pin including a male thread having a varying-thread-width portion and a box including a female thread having a varying-thread-width portion, where the male thread engages the female thread, and a shoulder provided on the pin is not in contact with a shoulder provided on another member when a stab flank and a load flank of the male thread contact a stab flank and a load flank, respectively, of the female thread and, with a further rotation in a make-up direction, the shoulder provided on the pin is capable of contacting the shoulder provided on the other member before the threads yield.

If the threaded connection has one of these constructions, when stab flanks and load flanks of the male thread contact stab flanks and load flanks of the female thread, torque increases along the straight line k2 shown in FIG. 4 as stab flanks and load flanks of the male thread interfere with stab flanks and load flanks of the female thread even when the shoulder provided on the pin is not in contact with the shoulder provided on the other member, and, with a further rotation in the make-up direction and when the shoulder provided on the pin contacts the shoulder provided on the other member before the threads yield, torque further increases along the curved line k3 shown in FIG. 4 as the shoulder provided on the pin interferes with the shoulder provided on the other member. Further, sufficient sealing performance in the seal is provided as stab flanks and load flanks of the male thread contact stab flanks and load flanks of the female thread, because this enlarges the range of torque that provides a predetermined performance in the threaded connection.

It should be understood that the embodiments disclosed herein are exemplary in every respect and not limitative. The scope of the present invention is not defined by the above-described embodiments but by the claims, and it is contemplated that all the modifications within the spirit and scope equivalent to those of the claims are included.

INDUSTRIAL APPLICABILITY

The present invention may be applied to threaded connections.

The invention claimed is:

1. A threaded connection for connecting pipes, comprising:
   a pin including a wedge male thread having a varying-thread-width portion; and
   a box including a wedge female thread having a varying-thread-width portion,
   wherein the male thread engages the female thread,
   the threaded connection is constructed such that, when a stab flank and a load flank of the male thread contact a stab flank and a load flank, respectively, of the female thread, a shoulder provided on the pin is not in contact with a shoulder provided on another member, and, with a further rotation in a make-up direction, the shoulder provided on the pin is capable of contacting the shoulder provided on the other member before the threads yield, and
   each of the male thread and the female thread further includes a constant-thread-width portion.

2. The threaded connection according to claim 1, wherein, in the varying-thread-width portion, a stab flank, a crest and a load flank of the male thread contact a stab flank, a root and a load flank, respectively, of the female thread to provide sealability at the threaded connection.

3. The threaded connection according to claim 2, wherein:
   the threaded connection fastens a pair of pipes using a coupling;
   the pin is provided on a pipe end of each of the pair of pipes, and includes a shoulder on a tip thereof;
   the box is provided on each end of the coupling; and
   the threaded connection is constructed such that, when stab flanks and load flanks of the male threads of the pins of the pair of pipes contact stab flanks and load flanks, respectively, of the female threads of the box, the shoulders of the pins of the pair of pipes are not in contact with each other, and, with a further rotation in the make-up direction, the shoulders of the pins of the pair of pipes are capable of contacting each other before the threads yield.

4. The threaded connection according to claim 3, wherein one of the pins of the pair of pipes further includes a pin female sealing surface provided on an inner periphery of a tip thereof, and the other pin further includes a pin male sealing surface provided on an outer periphery of a tip thereof, and
   the pin female sealing surface sealingly contacts the pin male sealing surface.

5. The threaded connection according to claim 2, wherein:
   a shoulder is provided on a tip of the pin;
   a shoulder is provided on the box to correspond to the shoulder of the pin; and
   the threaded connection is constructed such that, when a stab flank and a load flank of the male thread contact a stab flank and a load flank, respectively, of the female thread, the shoulder of the pin is not in contact with the shoulder of the box, and, with a further rotation in the make-up direction, the shoulder of the pin is capable of contacting the shoulder of the box before the threads yield.

6. The threaded connection according to claim 1, wherein:
   the threaded connection fastens a pair of pipes using a coupling;
   the pin is provided on a pipe end of each of the pair of pipes, and includes a shoulder on a tip thereof;
   the box is provided on each end of the coupling; and
   the threaded connection is constructed such that, when stab flanks and load flanks of the male threads of the pins of the pair of pipes contact stab flanks and load flanks, respectively, of the female threads of the box, the shoulders of the pins of the pair of pipes are not in contact with each other, and, with a further rotation in the make-up direction, the shoulders of the pins of the pair of pipes are capable of contacting each other before the threads yield.

7. The threaded connection according to claim 6, wherein one of the pins of the pair of pipes further includes a pin female sealing surface provided on an inner periphery of a tip thereof, and the other pin further includes a pin male sealing surface provided on an outer periphery of a tip thereof, and
   the pin female sealing surface sealingly contacts the pin male sealing surface.

8. The threaded connection according to claim 1, wherein:
   a shoulder is provided on a tip of the pin;
   a shoulder is provided on the box to correspond to the shoulder of the pin; and
   the threaded connection is constructed such that, when a stab flank and a load flank of the male thread contact a stab flank and a load flank, respectively, of the female thread, the shoulder of the pin is not in contact with the shoulder of the box, and, with a further rotation in the make-up direction, the shoulder of the pin is capable of contacting the shoulder of the box before the threads yield.

9. The threaded connection according to claim 1, wherein:
   the pin includes a plurality of male thread stages and an intermediate shoulder provided between the plurality of male thread stages;
   the box includes a plurality of female thread stages and an intermediate shoulder provided between the plurality of female thread stages to correspond to the intermediate shoulder of the pin; and the threaded connection is constructed such that, when a stab flank and a load flank of a male thread of the pin provided on a pipe end of one of a pair of pipes contact a stab flank and a load flank, respectively, of a female thread, the intermediate shoulders of the pin and the box are not in contact with each other, and, with a further rotation in the make-up direction, the intermediate shoulders of the pin and the box are capable of contacting each other before the threads yield.

10. The threaded connection according to claim 1, wherein:
   a shoulder is provided on a tip of the box;
   a shoulder is provided on the pin to correspond to the shoulder of the box; and
   the threaded connection is constructed such that, when a stab flank and a load flank of the male thread contact a stab flank and a load flank, respectively, of the female thread, the shoulders of the box and the pin are not in contact with each other, and, with a further rotation in the make-up direction, the shoulders of the box and the pin are capable of contacting each other before the threads yield.

11. The threaded connection according to claim 1, wherein:
   the pin includes a pin sealing surface located closer to a pipe end and/or a pipe body than the male thread as determined along a pipe-axis direction;
   the box includes a box sealing surface provided to correspond to the pin sealing surface; and
   the pin sealing surface sealingly contacts the box sealing surface.

12. The threaded connection according to claim 1, wherein:
   the threaded connection is constructed such that, when the stab flank and the load flank of the male thread are in contact with the stab flank and the load flank, respectively, of the female thread in the varying-thread-width portions, in the constant-thread-width portions, the stab flank of the male thread has a gap relative to a stab flank of the female thread and the load flank of the male thread is in contact with the load flank of the female thread.

* * * * *